United States Patent
Coman et al.

(10) Patent No.: US 10,685,358 B2
(45) Date of Patent: Jun. 16, 2020

(54) THOUGHTFUL GESTURE GENERATION SYSTEMS AND METHODS

(71) Applicant: Capital One Services, LLC, McLean, VA (US)

(72) Inventors: Alexandra Coman, Tysons Corner, VA (US); Erik T. Mueller, Chevy Chase, MD (US); Margaret Mayer, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/997,032

(22) Filed: Jun. 4, 2018

(65) Prior Publication Data

US 2019/0272547 A1 Sep. 5, 2019

Related U.S. Application Data

(60) Provisional application No. 62/637,946, filed on Mar. 2, 2018.

(51) Int. Cl.
*G06Q 30/00* (2012.01)
*G06Q 10/06* (2012.01)
(Continued)

(52) U.S. Cl.
CPC ............ *G06Q 30/01* (2013.01); *G06N 20/00* (2019.01); *G06Q 10/063* (2013.01); *G10L 15/1822* (2013.01); *G10L 15/22* (2013.01)

(58) Field of Classification Search
CPC ................................. G06Q 10/00; G06Q 30/02
(Continued)

(56) References Cited

U.S. PATENT DOCUMENTS 7,676,369 B2 * 3/2010 Fujimoto ................ G10L 15/22
  704/231
8,170,196 B2 * 5/2012 Knott ............... G06Q 10/06311
  345/419

(Continued)

OTHER PUBLICATIONS

Alonso-Martin et al., Augmented Robotics Dialog System for Enhanced Homan-Robot Interaction, Jul. 3, 2015, creative commons. org, Sensors, 15(7), 15799-15829.*

(Continued)

*Primary Examiner* — Robert D Rines
(74) *Attorney, Agent, or Firm* — Troutman Sanders LLP; Christopher J. Forstner; John A. Morrissett

(57) ABSTRACT

Consistent with the disclosed embodiments, systems and methods are provided herein for autonomously generating a thoughtful gesture for a customer. In one example implementation of the disclosed technology, a method is provided that includes receiving incoming customer dialogue and determining, based on the customer dialogue, customer information including one or more of: customer preferences, customer biographical information, and customer current life circumstances. The method also includes generating, based on the customer information, gesture-specific information-eliciting utterances for additional dialogue with the customer and identifying one or more response opportunities based on additional incoming customer dialogue responsive to sending the gesture-specific information-eliciting utterances to the customer. Further, the method includes generating a thoughtful gesture based on the identified one or more response opportunities and outputting, for presentation to the customer, the thoughtful gesture.

14 Claims, 7 Drawing Sheets

(51) Int. Cl.
 G10L 15/18 (2013.01)
 G10L 15/22 (2006.01)
 G06N 20/00 (2019.01)
(58) Field of Classification Search
 USPC .............................................. 705/7.11–7.42
 See application file for complete search history.

(56) References Cited

U.S. PATENT DOCUMENTS

| | | | | |
|---|---|---|---|---|
| 9,268,765 | B1* | 2/2016 | Rose Charvet | G06F 17/274 |
| 2001/0049688 | A1* | 12/2001 | Fratkina | G06F 17/30654 |
| 2003/0028498 | A1* | 2/2003 | Hayes-Roth | G06N 99/005 706/17 |
| 2003/0101151 | A1* | 5/2003 | Holland | G06N 3/004 706/45 |
| 2008/0294423 | A1* | 11/2008 | Castellani | G06F 11/0733 704/4 |
| 2009/0076795 | A1* | 3/2009 | Bangalore | G06F 17/2785 704/9 |
| 2011/0055699 | A1* | 3/2011 | Li | G06F 16/951 715/709 |
| 2012/0010989 | A1* | 1/2012 | Ramer | G06Q 30/0247 705/14.46 |
| 2012/0089683 | A1* | 4/2012 | Griesmer | H04L 12/6418 709/206 |
| 2013/0030792 | A1* | 1/2013 | Zhao | G06F 17/2818 704/9 |
| 2013/0290234 | A1* | 10/2013 | Harris | G06N 5/022 706/46 |
| 2013/0325992 | A1* | 12/2013 | McGann | H04L 51/046 709/206 |
| 2014/0270109 | A1* | 9/2014 | Riahi | G06N 99/005 379/88.01 |
| 2015/0058006 | A1* | 2/2015 | Proux | G10L 15/26 704/235 |
| 2015/0140525 | A1* | 5/2015 | Metuki | A63F 13/63 434/169 |
| 2016/0350288 | A1* | 12/2016 | Wick | G06F 17/2735 |
| 2016/0379106 | A1* | 12/2016 | Qi | G06N 5/04 706/11 |

OTHER PUBLICATIONS

Boden, M.A. 1990. The Creative Mind: Myths and Mechanisms. Weidenfield and Nicholson, London.

Bridewell, W., and Bello, P. 2014. Reasoning about Belief Revision to Change Minds: A Challenge for Cognitive Systems. Advances in Cognitive Systems, 3, 107-122.

Charnley, J.W., Pease, A., and Colton, S. 2012. On the Notion of Framing in Computational Creativity. In Proc. of ICCC 2012, 77-81.

Colton, S.; Pease, A., and Charnley, J. 2011. Computational Creativity Theory: The FACE and IDEA Descriptive Models. In Proc. of ICCC 2011, 90-95.

Ghallab, M., Nau, D., and Traverso, P. 2004. Automated Planning: Theory and Practice. San Francisco: Elsevier.

Gil, Y. 2017. Thoughtful Artificial Intelligence: Forging a New Partnership for Data Science and Scientific Dis-covery. Data Science, 1(1-2): 119-129.

Grace, K., and Maher, M.L. 2016. Surprise-Triggered Reformulation of Design Goals. Proc. of AAAI 2016: 3726-3732.

Grice, H. 1967. Logic and Conversation. Unpublished Manuscript. University of California, Berkeley.

Jarrold, W., and Yeh, P.Z. 2016. The Social-Emotional Turing Challenge. AI Magazine, 37(1):31-38.

Jordanous, A. 2012. Evaluating Computational Creativity: A Standardised Procedure for Evaluating Creative Systems and its Application. Ph.D. Dissertation, University of Sus-sex.

Loughran, R., and O'Neill, M. 2017. Application Domains Considered in Computational Creativity. In Proc. of ICCC 2017, 197-204.

O'Neill, B., and Riedl, M.O. 2011. Simulating the Everyday Creativity of Readers. In Proc. of ICCC 2011, 153-158.

Pease, A., and Colton, S. 2011. On Impact and Evaluation in Computational Creativity: A Discussion of the Turing Test and an Alternative Proposal. In Proc. of AISB Symp. on AI and Philosophy.

Pickering, T., and Jordanous, A. 2017. Applying Narrative Theory to Aid Unexpectedness in a Story Generation System. In Proc. of ICCC 2017, 213-220.

Prévot, L., Yao, Y., Gingold, A., Bel, B., and Chan, K.Y.J. 2015. Toward a Scary Comparative Corpus: The Werewolf Spoken Corpus. In Proc. of SEMDIAL 2015, 204-205.

Riedl., M.O. 2014. The Lovelace 2.0 Test of Artificial Creativity and Intelligence. In Proc. of "Beyond the Turing Test" AAAI Workshop.

Riedl, M.O. 2016. Computational Narrative Intelligence: A Human-Centered Goal for Artificial Intelligence. In Proc. of CHI 2016 Workshop on Human-Centered Machine Learning.

Schwartz, B. 1967. The Social Psychology of the Gift. The American Journal of Sociology 73 (1): 1-11.

Turing, A.M. 1950. Computing Machinery and Intelligence. Mind, 59:433-460.

Veale, T. 2015. Game of Tropes: Exploring the Placebo Effect in Computational Creativity. In Proc. of ICCC 2015, 78-85.

Ventura, D. 2016. Mere Generation: Essential Barometer or Dated Concept? In Proc. of ICCC 2016, 17-24.

Yannakakis, G.N., and Antonios Liapis, A. 2016. Searching for Surprise. In Proc. of of ICCC 2016, 25-32.

\* cited by examiner

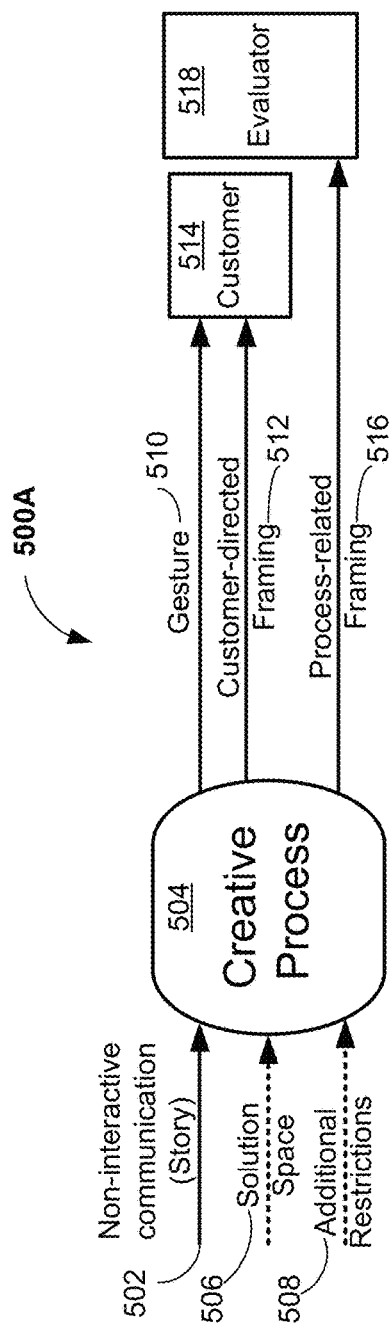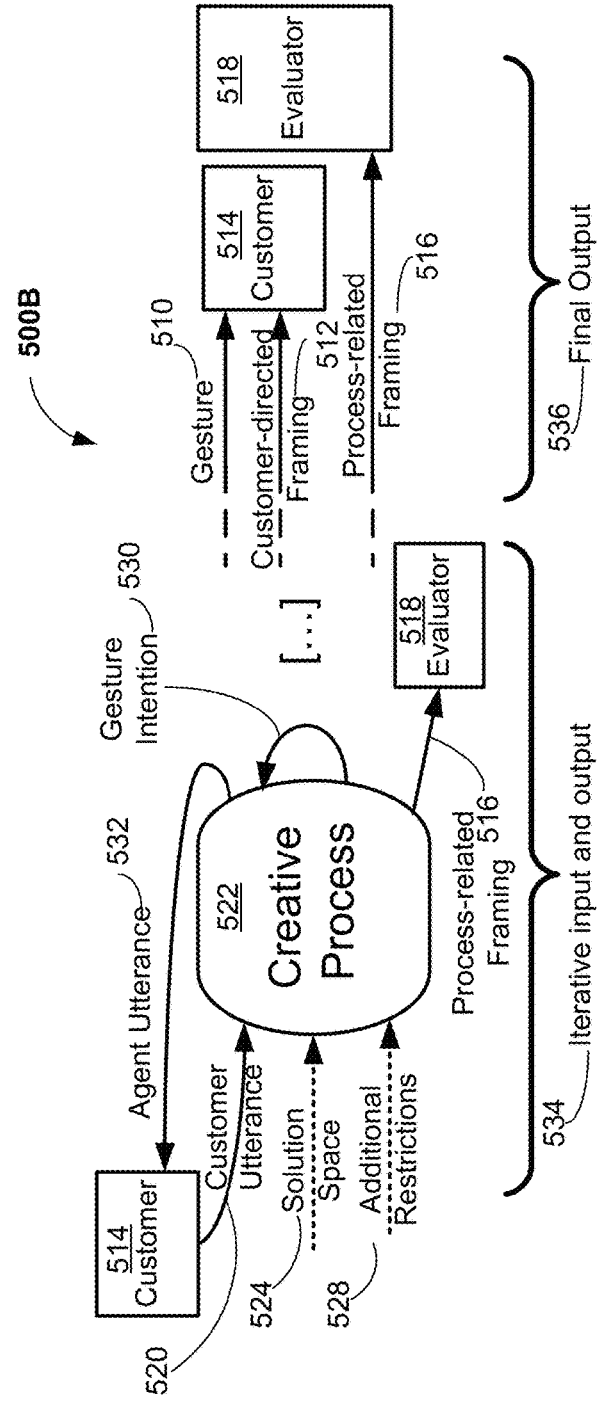

THOUGHTFUL GESTURE GENERATION SYSTEMS AND METHODS

CROSS REFERENCE TO RELATED APPLICATION

This application claims priority to U.S. Provisional Patent Application Ser. No. 62/637,946, filed on 2 Mar. 2018, entitled: "Thoughtful Gesture Generation Systems," the contents of which are hereby incorporated by reference in their entirety as if presented herein in full.

FIELD

The disclosed technology relates to thoughtful gesture generation, and more particularly automated systems and methods for generating thoughtful gestures for a customer based on communication and context.

BACKGROUND

Thoughtful gestures are among the most valued products of human social behavior. They serve to perpetuate kindness, and often exemplify everyday creativity. Giving a gift is a thoughtful gesture, often requiring much thought and creativity to select a gift that will demonstrate effort and thoughtfulness to the recipient. Giving and/or receiving an appropriate, thoughtful gesture after an interaction with another person is one of the ways humans strengthen friendships and express gratitude. Surprising a recipient with an unexpected gift can elicit a strong positive reaction in the recipient and further serve to strengthen a relationship. Such gestures are often used by customer service representatives to improve customer loyalty and/or improve difficult situations, such as a flight cancellation, a defective product, etc.

An example scenario in which a thoughtful gesture may be appropriate is illustrated by the following fictional but plausible story. Emma, a customer-service assistant at a bank, receives a call from Claire, who has lost her credit card while traveling overseas. The conversation begins as a normal discussion of Claire's banking issue, but leads to a childhood memory of Claire's, which reminds Emma of a passage from a favorite book. Emma thinks Claire may appreciate the connection, and Emma considers mentioning this to Claire, but then comes up with what she thinks is a better idea. After Claire's banking problem is resolved and the conversation ends, Emma orders a copy of the book and sends it to Claire as a present, with an explanatory note. Perhaps the present will brighten Claire's mood after having to deal with the lost card issue, and perhaps it will inspire her to do something kind for someone else.

Providing such thoughtful gestures may utilize various types of creativity, knowledge, reasoning, and emotional intelligence, for example, to identify situations in which such gestures are opportune and appropriate for the receiver, and based on the situations that prompt the gestures. Furthermore, the element of surprise may further enhance the positive impact of the gesture.

The recent improvements and proliferation of artificial intelligence-based systems allows organizations to automate certain customer service functions (via chatbots, for example) such that customers have difficulty discerning if they are interacting with a human or a machine, which is an aspect intended to be measured by the famous Turing Test. To further elicit strong positive reactions and loyalty in their customers, an organization may further benefit from automated customer-service systems that can provide an appropriate thoughtful gesture.

Accordingly, there is a need for improved, automated customer-service systems that can provide an appropriate, customer-specific thoughtful gesture. Embodiments of the present disclosure are directed to this and other considerations.

SUMMARY

Disclosed herein are systems and methods for generating thoughtful gestures. Certain example implementations of the disclosed technology provide a Turing-Test-alternative challenge for evaluating an artificial intelligent agent's ability to produce such gestures.

Consistent with the disclosed embodiments, a system is provided for autonomous generation of a thoughtful gesture for a customer. The system includes a dialogue management device having one or more processors, a rules-based platform, a natural language processing device, and memory in communication with the one or more processors and storing instructions that, when executed by the one or more processors, cause the dialogue management device to perform one or more steps of a method for generating a customer-specific thoughtful gesture. The method may include receiving incoming customer dialogue and determining customer information including one or more of: customer preferences, customer biographical information, and customer current life circumstances. The method may also include identifying one or more response opportunities based on one or more of the determined customer information and a dialogue trigger. Further, the method may include generating, within a solution space, a thoughtful gesture based on the identified one or more response opportunities and outputting, for presentation to the customer, the thoughtful gesture. In certain example implementations, the system may further include a trained machine learning model.

Consistent with the disclosed embodiments, a computer-implemented method is provided for autonomously generating a thoughtful gesture for a customer. The method may include receiving incoming customer dialogue and determining, based on the customer dialogue, customer information including one or more of: customer preferences, customer biographical information, and customer current life circumstances. The method may also include generating, based on the customer information, gesture-specific information-eliciting utterances for additional dialogue with the customer. Further, the method may include identifying one or more response opportunities, such as gestures and/or utterances, based on additional incoming customer dialogue responsive to sending the gesture-specific information-eliciting utterances to the customer. Finally, the method may include generating a thoughtful gesture based on the identified one or more response opportunities and outputting, for presentation to the customer, the thoughtful gesture.

Consistent with the disclosed embodiments, another computer-implemented method is provided for autonomously generating a thoughtful gesture for a customer. The method may include receiving non-interactive communication associated with a customer, and determining, based on the non-interactive communication, customer information comprising one or more of: customer preferences, customer biographical information, and customer current life circumstances. The method may also include generating, based on the customer information, a thoughtful gesture and outputting, for presentation to the customer, the thoughtful gesture.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 5A is an input/output diagram 500A for a non-interactive variant of a challenge module in accordance with certain embodiments of the disclosed technology;

FIG. 5B is an input/output diagram 500B for an interactive variant of a challenge module, in accordance with certain embodiments of the disclosed technology;

DETAILED DESCRIPTION

Figure 1:
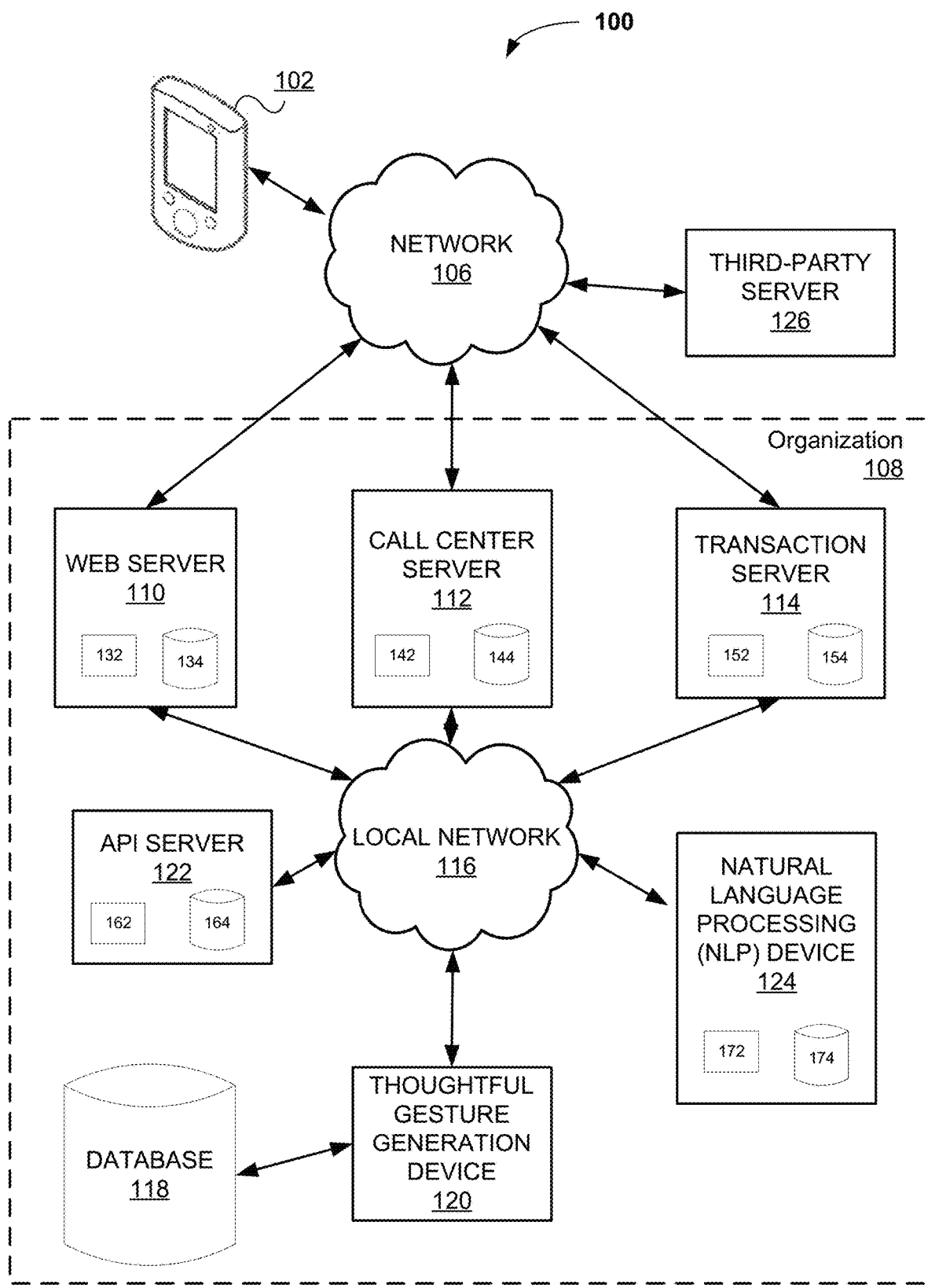
FIG. 1 is a block diagram of an example system 100 that may be used to automatedly generate thoughtful gestures for customers.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

According to certain example implementations of the disclosed technology, systems and methods are disclosed herein for generating one or more thoughtful gestures for a customer based on non-interactive input and/or dialogue with the customer. For example, in one aspect, a system for autonomous generation of a thoughtful gesture for a customer is provided. The system includes a dialogue management device having one or more processors, a rule-based platform, a trained machine learning model, a natural language processing device, and memory in communication with the one or more processors and storing instructions that, when executed by the one or more processors, cause the dialogue management device to perform steps of a method. The instructions may cause the device to receive incoming customer dialogue and determine customer information including one or more of: customer preferences, customer biographical information, and customer current life circumstances. The instructions may also cause the device to identify one or more response opportunities based on one or more of the determined customer information and a dialogue trigger. The instructions may further cause the device to generate a thoughtful gesture based on the identified one or more response opportunities and output, for presentation to the customer, the thoughtful gesture. According to an example implementation of the disclosed technology, the response opportunity may be identified and output in the form of a specific response. In another example implementation, the response opportunity may be identified and ultimately output as a thoughtful gesture. In certain example implementations, the response opportunity may be identified and a thoughtful gesture may be scheduled accordingly.

In certain example implementations, there can be a pre-established solution space. According to an example implementation of the disclosed technology, the thoughtful gesture may be selected from multiple-choice solutions. In certain example implementations, the generated gesture can be a natural-language construct describing a sequence of actions.

In certain example implementations, the instructions may be further configured to cause the dialogue management device to generate agent dialogue responsive to the incoming customer dialogue to further identify response opportunities. In certain example implementations, the instructions may be configured to cause the dialogue management device to generate and send surprise-preserving dialogue to the customer to elicit additional information, which may be utilized to refine the thoughtful gesture.

In certain example implementations, the dialogue trigger can include salient information from customer utterances received by the system.

In another aspect, a computer-implemented method for autonomously generating a thoughtful gesture for a customer is provided. The method may include receiving incoming customer dialogue and determining, based on the customer dialogue, customer information including one or more of: customer preferences, customer biographical information, and customer current life circumstances. The method may also include generating, based on the customer information, gesture-specific information-eliciting utterances for additional dialogue with the customer and identifying one or more response opportunities based on additional incoming customer dialogue responsive to sending the gesture-specific information-eliciting utterances to the customer. Further, the method may include generating a thoughtful gesture based on the identified one or more response opportunities and outputting, for presentation to the customer, the thoughtful gesture.

According to an example implementation of the disclosed technology, the thoughtful gesture may be generated based on a pre-established solution space. In an example implementation, identifying the one or more response opportunities may be based on a dialogue trigger. In certain example implementations, the dialogue trigger can include salient information from customer utterances received by the system.

According to an example implementation of the disclosed technology, the method may include generating surprise-preserving dialogue for sending to a computing device associated with the customer to elicit additional information.

In certain example implementations, surprise-preserving dialogue may be utilized to elicit additional information relevant to the gesture generation process, while avoiding revealing information associated with the thoughtful gesture, and/or to avoid revealing the intention to make a thoughtful gesture Certain example implementations of the disclosed technology may include generating one or more of: gesture intentions; general information-eliciting utterances when no partial gesture candidates are determined; and candidate gestures.

According to an example implementation of the disclosed technology, the method can include one or more of: identifying relevant missing gesture-related information; generating gesture-specific information-eliciting utterances; acquiring supporting evidence for a gesture; acquiring contrary evidence for a gesture; abandoning a candidate gesture; refining a candidate gesture; masking an utterance intention to preserve the informational content elicitation potential of the utterance while increasing its context justifiability; abandoning a gesture intention; and committing to a gesture.

In yet another aspect, another computer-implemented method for autonomously generating a thoughtful gesture for a customer is provided. The method may include receiving a non-interactive communication associated with a customer and determining, based on the non-interactive communication, customer information comprising one or more of: customer preferences, customer biographical information, and customer current life circumstances. The method may also include generating, based on the customer information, a thoughtful gesture and outputting, for presentation to the customer, the thoughtful gesture.

In certain example implementations, the thoughtful gesture may be output in the form of textual, audible, and/or video information that is sent to the customer for display on a computing device associated with the customer. In other example implementations, the thoughtful gesture may be output in the form of an order for one or more products or services from a selected merchant for sending to the customer.

In accordance with certain example implementations of the disclosed technology, the thoughtful gesture may be output to a computing device associated with a customer service representative, for example, as one or more suggestions for further selection, committing, or abandoning.

According to certain example implementations of the disclosed technology, the terms "discourse" and/or "dialogue" as used herein may refer to information and/or communication received from a customer and/or provided to a customer as part of the interaction(s) between the customer and the intelligent agent system. In some implementations, such interactions may utilize certain communication channels (such as e-mail, messaging, etc.) to exchange textual, audible and/or video information. Certain example implementations may utilize customer history records and/or records of communications with human customer service representatives to provide additional context for the interaction between the customer and the intelligent agent system. According to certain example implementations of the disclosed technology, the discourse and/or dialogue may be in the form of interactive (i.e., back-and-forth, two-way, conversation-like) communications between the customer and the intelligent agent system. In some implementations, the discourse and/or dialogue may be in the form of non-interactive (i.e., single-sided, one-way, story-like) communications. In certain example implementations, records of interactive and/or non-interactive communications conducted with the customer may be utilized. In certain implementations, such communication information may be obtained, for example, through a chat window, e-mail, phone call, etc., and/or recorded through textual, audible and/or video information channels.

In certain example implementations, the system may execute instructions to conduct general dialogue with a customer to identify a first trigger of a predetermined plurality of triggers. Upon identifying the first trigger, the system may generate one or more gesture intentions and initiate surprise-preserving dialogue. Optionally, in some embodiments, the system may generate general information-eliciting utterances (e.g., evaluation criteria: informational-content-eliciting potential or ICEP, surprise-preservation potential or SPP, and context justifiability or CJ) and mask utterance intention to acquire relevant information. Regardless of whether additional information is required, the system may generate one or more candidate gestures. Upon doing so, the system may identify relevant missing information and generate gesture-specific information-eliciting utterances (e.g., evaluation criteria: ICEP, SPP, CJ) and mask utterance intention.

In certain example implementations, the system may additionally generate and conduct surprise-preserving dialogue (e.g., evaluation criteria: ICEP, SPP, CJ) and either refine the candidate gesture or acquire supporting evidence for the candidate gesture, which may incorporate identified relevant missing information. The acquired supporting/contrary evidence may be used by the system to refine or further refine the candidate gesture. Upon acquiring the supporting or contrary evidence, the system may either abandon the gesture, abandon the gesture intention, conduct additional surprise-preserving dialogue, or reach a predetermined gesture threshold. Once the gesture threshold is reached or the gesture has been abandoned, the system may continue conducting general dialogue. In some embodiments, the system may commit to the gesture or abandon the gesture mid-conversation. In other embodiments, the system may first determine that the conversation has ended before determining whether to commit to the gesture or abandon the gesture.

In accordance with certain example implementations, the systems and methods disclosed herein include virtual assistants with thoughtful-gesture-generation capabilities, which may be utilized to create value for organizations through richer customer interaction. Certain example implementations of the disclosed technology may be informed by social norms and aligned with human goals, but may operate and interact with a customer without the need for a human customer service representative.

Certain example implementations of the disclosed technology provide certain techniques for evaluating an artificially intelligent (AI) agent's ability to generate thoughtful gestures based on non-interactive input (such as customer stories) and/or interactive communications (such as a conversation). Such techniques may serve as an alternative to the Turing-Test (Turing, A. M., "Computing Machinery and Intelligence. Mind," 59:433-460, 1950). Certain example implementations of the disclosed technology may be utilized for evaluating AI agents as applied in modern customer service settings, for example, in banking and/or other financial industries and settings.

In accordance with certain example implementations of the disclosed technology, a thoughtful gesture may be (a) directed toward another person, (b) intended to have a positive impact on the person it is directed toward, and may also be (c) intended to be surprising to the person it is directed toward (though not all gestures need to be surprising). The gesture may be solicited or unsolicited. The gesture may be accompanied by framing (Charnley, J. W., Pease, A., and Colton, S., "On the Notion of Framing in Computational Creativity," In Proc. of ICCC, pp. 77-81, 2012). For example, the framing may be customer-directed, in the form of a note addressed to the customer and/or process-related, for example, revealing the system's creative processes, thus demonstrating its intentionality. While banking-related example conversations are used in some of the examples described herein (hence, the "customer" and "agent" terms we use to refer to the two conversational partners), the process may be generalizable to any dialogue and/or discourse context.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system 100 that may be used to automatedly generate thoughtful gestures for customers. The system 100 may be configured to perform one or more processes that can adaptively generate thoughtful gestures based on an ever-evolving customer context associated with customer interactions. The components and arrangements shown in FIG. 1 are not intended to limit the disclosed embodiments as the components used to implement the disclosed processes and features may vary. As shown, system 100 may include a user device 102, a network 106, and an organization 108 including, for example, a web server 110, a call center server 112, a transaction server 114, a local network 116, a thoughtful gesture generation device 120, a database 118, an API server 122, and a natural language processing device 124 (which may be referred to herein as an NLP device).

In some embodiments, a customer may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of organization 108. In some embodiments, the user device 102 may include or incorporate electronic communication devices for hearing or vision impaired users. In certain example implementations, the user device 102 may belong to or be provided by a customer, or may be borrowed, rented, or shared. Customers may include individuals such as, for example, subscribers, clients, prospective clients, or customers of an entity associated with the organization 108, such as individuals who have obtained, will obtain, or may obtain a product, service, or consultation from an entity associated with the organization 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

The third-party server 126 may include a computer system associated with an entity (other than the entity associated with organization 108 and its customers) that performs one or more functions associated with the organization 108 and its customers. For example, the third-party server 126 can include an automated teller machine (ATM) system that allows a customer to withdraw money from an account managed via the organization 108. As another example, the third-party server 126 may include a server associated with a store where a customer intends to make a purchase using funds held in an account that an entity associated with the organization 108 manages. As another example, the third-party server 126 may include a computer system associated with a product repair service that submits a warranty claim for a product that a customer purchased from the entity associated with the organization 108.

The organization 108 may be associated with and optionally controlled by an entity such as a business, corporation, individual, partnership, or any other entity that provides one or more of goods, services, and consultations to individuals such as customers. The organization 108 may include one or more servers and computer systems for performing one or more functions associated with products and/or services that the organization 108 provides. Such servers and computer systems may include, for example, the web server 110, the call center server 112, and/or the transaction server 114, as well as any other computer systems necessary to accomplish tasks associated with the organization 108 or the needs of customers (which may be customers of the entity associated with the organization 108). The web server 110 may include a computer system configured to generate and provide one or more websites accessible to customers, as well as any other individuals involved in organization 108's normal operations. The web server 110 may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices (e.g., the thoughtful gesture generation device 120) of the system 100. In some embodiments, one or more processors 132 may be used to implement an automated natural language dialogue system that may interact with a customer via different types of communication channels such as a website, mobile application, instant messaging application, SMS message, email, or any other type of electronic communication. When receiving an incoming message from, for example, the user device 102 of a customer, the web server 110 may be configured to determine the type of communication channel the user device 102 used to generate the incoming message.

The call center server 112 may include a computer system configured to receive, process, and route telephone calls and other electronic communications between a customer operating a user device 102 and the thoughtful gesture generation device 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices (e.g., thoughtful gesture generation device 120) of the system 100. In some embodiments, the call center server processor 142 may be used to implement an interactive voice response (IVR) system that interacts with the customer over the phone.

The transaction server 114 may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. The transaction server 110 may have one or more processors 152 and one or more transaction server databases 154, which may be any suitable repository of transaction data. Information stored in transaction server 110 may be accessed (e.g., retrieved, updated, and added to) via the local network 116 (and/or network 106) by one or more devices (e.g., the thoughtful gesture generation device 120) of the system 100.

In some embodiments, the transaction server 114 tracks and stores event data regarding interactions between a third-party, such as a third-party server 126, with the organization 108, and on behalf of the individual customers. For example, the transaction server 114 may track third-party interactions such as purchase requests, refund requests, warranty claims, account withdrawals and deposits, and any other type of interaction that the third-party server 126 may conduct with the organization 108 on behalf of an individual such as customer.

The local network 116 may include any type of computer networking arrangement used to exchange data in a localized area, such as WiFi, Bluetooth™ Ethernet, and other suitable network connections that enable components of the organization 108 to interact with one another and to connect to the network 106 for interacting with components in the system 100 environment. In some embodiments, the local network 116 may include an interface for communicating with or linking to the network 106. In other embodiments, certain components of the organization 208 may communicate via the network 106, without a separate local network 116.

The thoughtful gesture generation device 120 may include one or more computer systems configured to compile data from a plurality of sources, such as the web server 110, the call center server 112, and the transaction server 114. The thoughtful gesture generation device 120 may correlate compiled data, analyze the compiled data, arrange the compiled data, generate derived data based on the compiled data, and store the compiled and derived data in a database such as the database 118. According to some embodiments, the database 118 may be a database associated with the organization 108 and/or its related entity that stores a variety of information relating to customers, transactions, and business operations. The database 118 may also serve as a back-up storage device and may contain data and information that is also stored on, for example, databases 134, 144, 154, 164, 174 (and 280, as will be discussed with reference to FIG. 2). The database 118 may be accessed by the thoughtful gesture generation device 120 and may be used to store records of every interaction, communication, and/or transaction a particular customer has had with the organization 108 and/or its related entity in the past to enable the creation of an ever-evolving customer context that may enable the thoughtful gesture generation device 120 to generate and provide customized thoughtful gestures to a customer based on interactions with the customer.

The API server 122 may include a computer system configured to execute one or more application program interfaces (APIs) that provide various functionalities related to the operations of the organization 108. In some embodiments, the API server 122 may include API adapters that enable the API server 122 to interface with and utilize enterprise APIs maintained by the organization 108 and/or an associated entity that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. The API server 112 may include one or more processors 162 and one or more API databases 164, which may be any suitable repository of API data. Information stored in the API server 122 may be accessed (e.g., retrieved, updated, and added to) via the local network 116 (and/or network 106) by one or more devices (e.g., thoughtful gesture generation device 120) of system 100. In some embodiments, the API processor 162 may be used to implement one or more APIs that can access, modify, and retrieve customer account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

The natural language processing device (NLP device) 124 may include a computer system configured to receive and process incoming dialogue messages and determine a meaning of the incoming dialogue message. For example, the NLP device 124 may be configured to receive and execute a command containing an incoming dialogue message where the command instructs the NLP device 124 to determine the meaning of the incoming dialogue message. The NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. For example, the NLP device 124 may receive an incoming dialogue message stating "Hello, I would like to know my account balance please," and may determine that this statement represents a request for an account balance. The NLP device 124 may be configured to output an event representing the meaning of the incoming dialogue message to an event queue for processing by another device. In some embodiments, the NLP device 124 may be configured to generate a natural language phrase in response to receiving a command. Accordingly, in some embodiments, the NLP device 124 may be configured to output an event that contains data representing natural language dialogue.

The NLP device 124 may have one or more processors 172 and one or more NLP databases 174, which may be any suitable repository of NLP data. Information stored in the NLP device 124 may be accessed (e.g., retrieved, updated, and added to) via the local network 116 (and/or network 106) by one or more devices (e.g., the thoughtful gesture generation device 120) of system 100. In some embodiments, the NLP processor 172 may be used to implement an NLP system that can determine the meaning behind a string of text and convert it to a form that can be understood by other devices.

Although the preceding description describes various functions of the web server 110, the call center server 112, the transaction server 114, the thoughtful gesture generation device 120, the database 118, the API server 122, and the natural language processing (NLP) device 124, in some embodiments, some or all of these functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
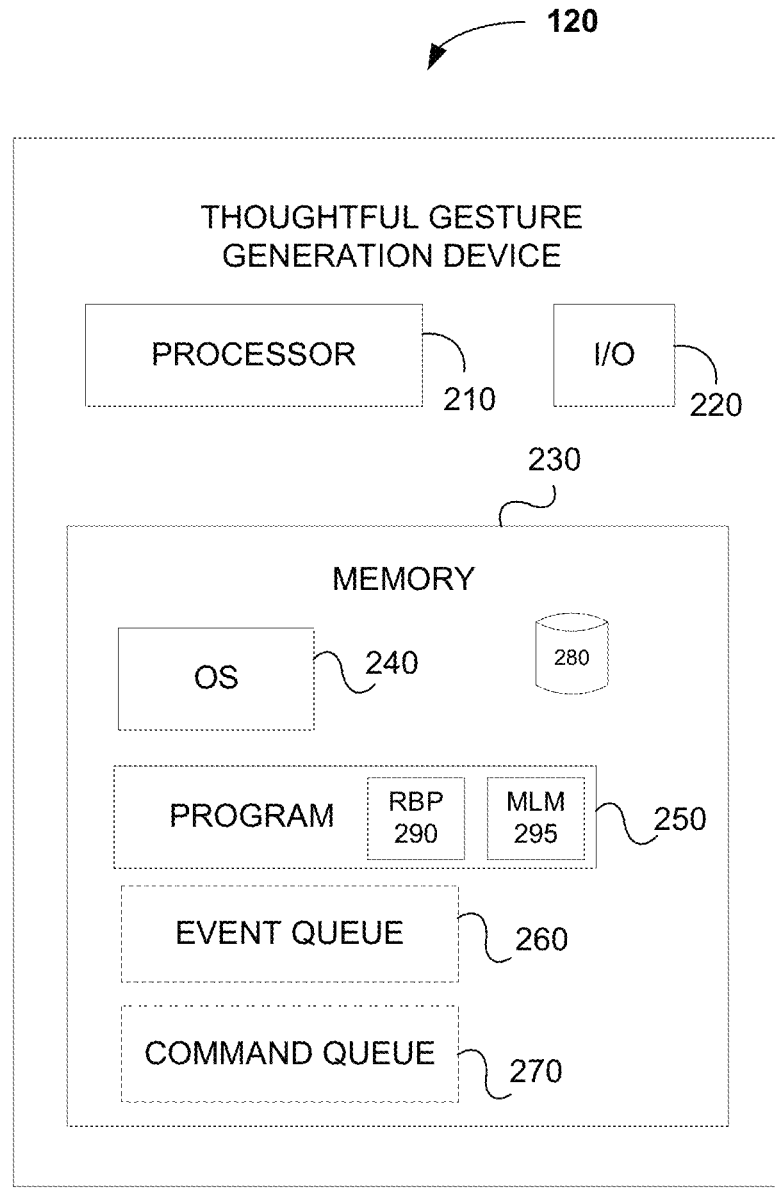
FIG. 2 is a block diagram of an example thoughtful gesture generation device 120, as shown in FIG. 1 and with additional details.

FIG. 2 is a block diagram (with additional details) of the example thoughtful gesture generation device 120, as also depicted in FIG. 1. According to some embodiments, the user device 102, the web server 110, the call center server 112, the transaction server 114, the API server 122, the NLP device 124, and the third-party server 126, as depicted in FIG. 1, may have a similar structure and components that are similar to those described with respect to thoughtful gesture generation device 120 shown in FIG. 2. As shown, the thoughtful gesture generation device 120 may include a processor 210, an input/output ("I/O") device 220, a memory 230 containing an operating system ("OS") 240 and a program 250. In certain example implementations, the thoughtful gesture generation device 120 may be a single server or may be configured as a distributed computer system including multiple servers or computers that interoperate to perform one or more of the processes and functionalities associated with the disclosed embodiments. In some embodiments, the thoughtful gesture generation device 120 may further include a peripheral interface, a transceiver, a mobile network interface in communication with the processor 210, a bus configured to facilitate communication between the various components of the thoughtful gesture generation device 120, and a power source configured to power one or more components of the thoughtful gesture generation device 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The thoughtful gesture generation device 120 may include one or more storage devices configured to store information used by the processor 210 (or other components) to perform certain functions related to the disclosed embodiments. In one example, the thoughtful gesture generation device 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the thoughtful gesture generation device 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the thoughtful gesture generation device 120 may include the memory 230 that may include one or more programs 250 to perform one or more functions of the disclosed embodiments. For example, in some embodiments, the thoughtful gesture generation device 120 may additionally manage dialogue and/or other interactions with the customer via a program 250. In certain example implementations, the program 250 that may include a rule-based platform (RBP) 290 for generating zero or more commands in response to processing an event in accordance with a set of predefined rules. In some embodiments, the thoughtful gesture generation device 120 may include a trained machine learning model (MLM) 295 for generating zero or more commands in response to processing an event, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a customer information database 280 for storing related data to enable the thoughtful gesture generation device 120 to perform one or more of the processes and functionalities associated with the disclosed embodiments. The customer information database 280 may include stored data relating to a customer profile and customer accounts, such as for example, customer identification information (e.g., name, age, sex, birthday, address, VIP status, key customer status, preferences, preferred language, vehicle(s) owned, greeting name, channel, talking points (e.g., favorite sports team, etc.), bank accounts, mortgage loan accounts, car loan accounts, other such accounts, account numbers, authorized users associated with one or more accounts, account balances, account payment history, and other such typical account information. The customer information database 280 may further include stored data relating to previous interactions between the organization 108 (or its related entity) and a customer. For example, the customer information database 280 may store customer interaction data that includes records of previous customer service interactions with a customer via a website, SMS, a chat program, a mobile application, an IVR system, or notations taken after speaking with a customer service agent. The customer information database 280 may also include information about business transactions between the organization 108 (or its related entity) and a customer that may be obtained from, for example, the transaction server 114. The customer information database 280 may also include customer feedback data such as an indication of whether an automated interaction with a customer was successful, online surveys filled out by a customer, surveys answered by a customer following previous interactions to the company, digital feedback provided through websites or mobile applications associated with the organization 108 or its related entity (e.g., selecting a smiley face or thumbs up to indicate approval), reviews written by a customer, complaint forms filled out by a customer, information obtained from verbal interactions with customer (e.g., information derived from a transcript of a customer service call with a customer that is generated using, for example, voice recognition techniques) or any other types of communications from a customer to the organization 108 or its related entity. According to some embodiments, the functions provided by the customer information database may also be provided by a database that is external to the thoughtful gesture generation device 120, such as the database 118 as shown in FIG. 1.

The memory 230 may also include an event queue 260 for temporarily storing queued events and a command queue 270 for temporarily storing queued commands. The processor 210 may receive events from the event queue 260 and in response to processing the event using the rule-based platform 290 and/or the trained machine learning model 295, may generate zero or more commands to be output to the command queue 270. According to some embodiments, the thoughtful gesture generation device 120 may place commands in the command queue 270 in the order they are generated. Each command may be designated to be executed by one or more devices, such as, for example, the web server 110, the call center server 112, the transaction server 114, the API server 122, or the NLP device 124 as shown in FIG. 1. Each such device (such as, for example the API server 122 or NLP device 124) may continuously or intermittently monitor the command queue 270 to detect commands that are designated to be executed by the monitoring device and may access pertinent commands. The event queue 260 may receive events from other devices, such as, for example, the user device 102, the web server 110, the call center server 112, the transaction server 114, the API server 122, and the NLP device 124 as shown in FIG. 1. According to some embodiments, events may be placed in the event queue 260 in a first-in first-out (FIFO) order, such that events may then processed by the thoughtful gesture generation device 120 in the order they are received or generated.

The thoughtful gesture generation device 120 may also be communicatively connected to one or more memory devices (e.g., databases) locally or through a network. The remote memory devices may be configured to store information and may be accessed and/or managed by the thoughtful gesture generation device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The thoughtful gesture generation device 120 may also include one or more I/O devices 220 that may comprise one or more interfaces for receiving signals or input from devices and providing signals or output to one or more devices that allow data to be received and/or transmitted by the thoughtful gesture generation device 120. For example, the thoughtful gesture generation device 120 may include interface components, which may provide interfaces to one or more input devices, such as one or more keyboards, mouse devices, touch screens, track pads, trackballs, scroll wheels, digital cameras, microphones, sensors, and the like, that enable the thoughtful gesture generation device 120 to receive data from one or more users (such as, for example, via the user device 102).

In example embodiments of the disclosed technology, the thoughtful gesture generation device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the thoughtful gesture generation device 120 has been described as one form for implementing the techniques described herein, other, functionally equivalent techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the thoughtful gesture generation device 120 may include a greater or lesser number of components than those illustrated.

Figure 3:
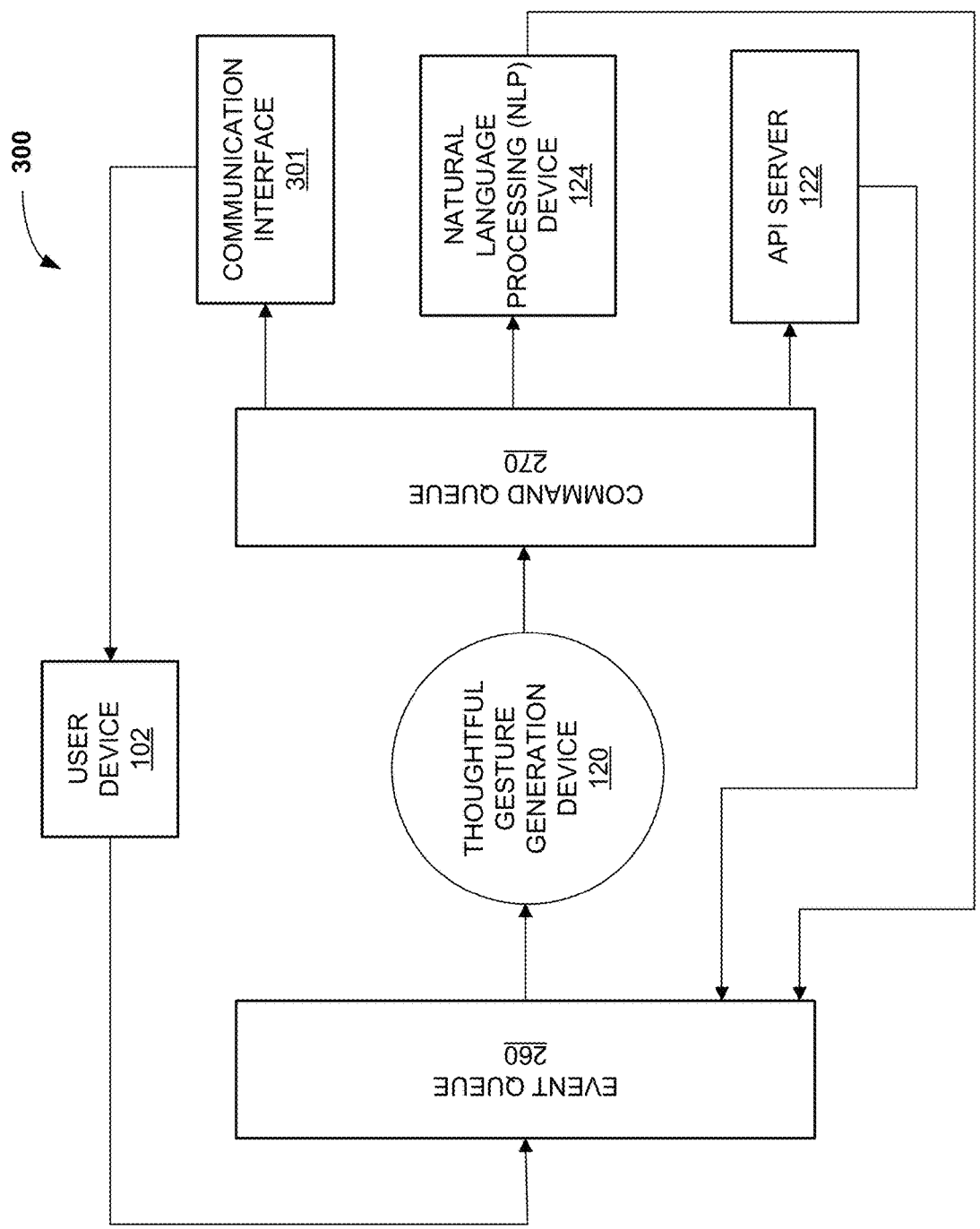
FIG. 3 is a block diagram 300 depicting functionality for automatedly generating thoughtful gestures, according to an example implementation of the disclosed technology.

FIG. 3 is a block diagram 300 depicting functionality for automatedly generating thoughtful gestures, according to an example implementation of the disclosed technology. In certain example implementations of the disclosed technology, some or all of the processes or functions as shown in the diagram 300 of FIG. 3 may correspond to like elements shown in FIG. 1, and may be executed by the system 100. It is contemplated that the system 100 (e.g., via the thoughtful gesture generation device 120 or a separate dialogue management device) may also provide and manage dialogue with the customer throughout the interaction(s) that ultimately leads to generating and providing a thoughtful gesture to the customer. The methods disclosed herein may correspond to the system functionality diagram 300 shown in FIG. 3, and may be performed by system 100 (e.g., entirely or partially via the thoughtful gesture generation device 120 using the processor 210 to execute memory 230 as shown in FIG. 2, and optionally with other steps delegated to other elements in system 100, such as the user device 102, the web server 110, the call center server 112, the transaction server 114, the API server 122, or the natural language processing device 124).

As shown in FIG. 3, a first event may be generated and placed in the event queue 260 in response to receiving a customer dialogue message. The event, for example, may be generated based on receiving a customer discourse/dialogue message sent via the user device 102. According to certain example implementations of the disclosed technology, a customer discourse/dialogue message may be communicated to the system 100 using various communication mediums, such as for example, SMS, a voice-to-text device, a chat application, an instant messaging application, a mobile application, an IVR system, or any other such medium that may be sufficient to send and/or receive electronic communications. In some embodiments, the incoming discourse/dialogue message may be received by a device of the organization 108, (as discussed above with respect to FIG. 1) such as web server 110, call center server 112, API server 112 or thoughtful gesture generation device 120. An event may be generated by, for example, a RESTful API interfacing with the receiving device. After the event is created, it may be placed in the event queue 260. In certain example implementations, the event queue 260 may be configured to temporarily store a plurality of events. According to some embodiments, events are placed in the event queue in a first-in first-out (FIFO) manner, such that the events will be executed in the order that they were received. In some embodiments, the event queue 260 and/or the command queue 270 may be part of thoughtful gesture generation device 120. In some embodiments, both the event queue 260 and the command queue 270 may be present on a device or component other than the thoughtful gesture generation device 120. For example, in some embodiments, the event queue 260 and the command queue 270 may be maintained on a cloud server that is accessible by the thoughtful gesture generation device 120, the API server 122, the NLP device 124, and/or the communication interface 301. According to some embodiments, an event may represent different types of information that can trigger or present an opportunity to provide a thoughtful gesture.

According to some embodiments, the thoughtful gesture generation device 120 may continuously or intermittently monitor the event queue 260. In response to detecting an event (e.g., the first event) in the event queue, the event may be received at the thoughtful gesture generation device 120 from the event queue 260. In some embodiments, the thoughtful gesture generation device 120 may include a rule-based platform, a trained machine learning model, and a customer context. According to some embodiments, the customer context may be derived from customer information associated with one or more customers that is stored in a database such as, for example, the database 118 and/or database 280 as discussed above with respect to FIG. 1 and/or FIG. 2. In some embodiments, the customer information may include one or more of account types, account statuses, transaction history, conversation history, people models, an estimate of customer sentiment, customer goals, and customer social media information. According to an example implementation of the disclosed technology, the customer context may allow the system 100 to generate a customized thoughtful gesture for one or more customers based on the customer context. According to some embodiments, the customer context may be updated each time the thoughtful gesture generation device 120 receives a new event from the event queue 260. For example, in some embodiments, the customer context may update by the thoughtful gesture generation device 120 receiving updated customer information from, for example, the database 118.

The thoughtful gesture generation device 120 may, in response to processing the first event, generate a first command to be placed in a command queue 270. According to some embodiments, the thoughtful gesture generation device 120 may generate a command based on the processed event, the customer context, and using one or more of a rule-based platform 290 and a trained machine learning model 295, as discussed above with reference to FIG. 2. For example, in some use cases a command may be generated using the rule-based platform 290, whereas in other use cases, a command may be generated using the trained machine learning model 295, and further use cases may be handled by both working in concert. In some embodiments, the trained machine learning model 295 may be used as a way of enhancing the performance of the rule-based platform 290 by, for example, determining which rules have priority over other rules and what rules should be applied in a given context. According to some embodiments, the commands generated by the thoughtful gesture generation device 120 in response to a particular event may change as the customer context is updated over time. Further, changes to the rules in the rule-based platform 290 or further training of the machine learning model 295 may also result in different commands being generated in response to the same event.

According to some embodiments, the trained machine learning model 295 may be trained by updating a natural language processing device database 174 (as discussed above with respect to FIG. 1) with communications from customers that have been labeled using, for example, a web user interface. The data in the NLP database 174 may undergo supervised training in a neural network model using a neural network training algorithm while the model is offline before being deployed in the system 100. According to some embodiments, a NLP model of the system 100 may utilize deep learning models such as a convolutional neural network (CNN) that transforms a word into a word vector and long short-term memory (LSTM) that transforms a sequence of word vectors into intent. The NLP model may also be trained to recognize named entities in addition to intents. For example, a named entity may include persons, places, organizations, account types, and product types. According to some embodiments, when the thoughtful gesture generation device 120 generates a command, such as a first command, it may determine an entity that will execute the command, such as, for example, the API server 122, the NLP device 124, a communication interface 301, or some other device or component, such that only the determined type of entity may pull the command from the command queue 270. For example, in the embodiment shown in FIG. 3, the thoughtful gesture generation device 120 may determine that the first command is to be executed by the NLP device 124 in order to determine the meaning of the incoming customer dialogue message. According to some embodiments, at the time the thoughtful gesture generation device 120 creates a new command, the thoughtful gesture generation device 120 may also update the customer information database 280 (or alternatively, external database 118) with information about a previous or concurrent transaction or customer interaction.

In certain example implementations, the NLP device 124 may receive the first command from the command queue 270, execute the command, and generate a second event to be placed in the event queue 260. According to some embodiments, the NLP device 124 may continuously or intermittently monitor the command queue 270 to detect new commands and upon detecting a new command, may receive the command from the command queue 270. Upon receiving a command, the NLP device 124 may perform various functions depending on the nature of the command. For example, in some cases, NLP device 124 may determine the meaning of an incoming dialogue message in response to executing the command. According to some embodiments, NLP device 124 may determine the meaning of an incoming dialogue message by utilizing one or more of the following artificial intelligence techniques: intent classification, named entity recognition, sentiment analysis, relation extraction, semantic role labeling, question analysis, rule extraction and discovery, and story understanding. Intent classification may include mapping text, audio, video, or other media into an intent chosen from a set of intents, which represent what a customer is stating, requesting, commanding, asking, or promising in, for example, an incoming customer dialogue message. Intent classifications may include, for example, a request for an account balance, a request to activate a credit/debit card, an indication of satisfaction, a request to transfer funds, or any other intent a customer may have in communicating a message. Named entity recognition may involve identifying named entities such as persons, places, organizations, account types, and product types in text, audio, video, or other media. Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested. Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 124 may perform natural language generation in response to receiving a command. According to some embodiments, the NLP device 124 may perform natural language generation by utilizing one or more of the following artificial intelligence techniques: content determination, discourse structuring, referring expression generation, lexicalization, linguistic realization, explanation generation. Content determination may involve deciding what content to present to the customer out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 3, the NLP device 124 may determine the meaning of the incoming customer dialogue message and convert it to a form that may be processed by the thoughtful gesture generation device 120. Accordingly, the second event generated by the NLP device 124 may represent a determined meaning of the incoming customer dialogue message and the NLP device 124 may send the second event to the event queue 260.

The thoughtful gesture generation device 120 may receive the second event from the event queue 260 in response to detecting it, as described above with respect to the thoughtful gesture generation device's 120 receipt of the first event. In some embodiments, the thoughtful gesture generation device 120 may also update the customer context at this point by receiving updated customer information from, for example, the database 118. The thoughtful gesture generation device 120 may, in response to processing the second event, generate a second command to be placed in a command queue 270. According to some embodiments, the thoughtful gesture generation device 120 may generate the second command based on the processed event, the customer context, and using one or more of a rule-based platform 290 and a trained machine learning model 295 as described above. In the example embodiment shown in FIG. 3, the second event may represent a customer's request to know, for example, their account balance. Based on the customer context, the rule-based platform 290 and/or trained machine learning model 295, the thoughtful gesture generation device 120 may decide, for example, using predictive analytics, that it has enough information to create a second event that represents instructions to an API associated with the API server 122 to look up the customer's account balance. However, in some embodiments, the thoughtful gesture generation device 120 may decide that, for example, it is too uncertain as to which account the customer is seeking information about and may instead create a second event that represents instructions to communication interface 301 to send a message to user device 102 requesting more information. Accordingly, based on the customer context, the rule-based platform 290, and the trained machine learning model 295, the thoughtful gesture generation device 120 may change or adapt its responses to a given request over time.

The thoughtful gesture generation device 120 may, in response to processing the second event, generate a second command to be placed in command queue 270. According to some embodiments, the thoughtful gesture generation device 120 may generate the second command based on the processed event, the customer context, and using one or more of rule-based platform 290 and trained machine learning model 295 in a fashion similar to the generation of the first command described above. According to some embodiments, the second command may represent a command to the API server 122 to retrieve customer information, such as, for example, the account balance information.

In some embodiments, the API server 122 may receive the second command from the command queue 270, execute the command, and generate a third event to be placed in the event queue 260. According to some embodiments, the API server 122 may continuously or intermittently monitor the command queue 270 to detect new commands and, upon detecting a new command, may receive the command from the command queue 270. Upon receiving a command, the API server 122 may perform various functions depending on the nature of the command. For example, in some cases, the API server 122 may call up an API stored locally or remotely on another device, to retrieve customer data (e.g., retrieve an account balance), perform an account action (e.g., make a payment on a customer account), authenticate a customer (e.g., verify customer credentials), and/or execute an opt-in/opt-out command (e.g., change account to opt-in to paperless notifications). Accordingly, in some embodiments, the third event may represent, for example, a retrieved account balance, an acknowledgement of the performance of an account action, an acknowledgement of the execution of an opt-in/opt-out command, and/or a verification or denial of a customer's credentials.

The thoughtful gesture generation device 120 may receive the third event from the event queue 260 in response to detecting it as described above. In some embodiments, the thoughtful gesture generation device 120 may also update the customer context at this point by receiving updated customer information from, for example, the database 118.

The thoughtful gesture generation device 120 may, in response to processing the third event, generate a third command to be placed in the command queue 270. According to some embodiments, the thoughtful gesture generation device 120 may generate the third command based on the processed third event and/or the customer context using one or more of the rule-based platform 290 and the trained machine learning model 295 in a fashion like the generation of the first command described above. In some embodiments, the thoughtful gesture generation device 120 may also generate a response dialogue message in response to processing an event, such as the third event. In some embodiments, the thoughtful gesture generation device 120 may receive a response dialogue message as an event produced by the NLP device 124. According to some embodiments, the third command may represent a command or instruction to the communication interface 301 to transmit the response dialogue message to, for example, the user device 102.

The communication interface 301 may receive and execute the third command, which may cause the communication interface 301 to transmit (e.g., via SMS) the response dialogue message to user device 102. In some embodiments, the communication interface 301 may continuously or intermittently monitor the command queue 270 for new commands and may receive the third command in response to detecting the third command in the command queue 270. According to some embodiments, the communication interface 301 may be a standalone device having some or all of the elements of the thoughtful gesture generation device 120 as shown in FIG. 2. In some embodiments, the communication interface 301 may be integrated into thoughtful gesture generation device 120 (e.g., as I/O device 220). In some embodiments, the communication interface 301 may be integrated into another device, such as, for example, the web server 110, the call center server 112, the transaction server 114, the API server 122, and/or the NLP server 124.

As shown in the example embodiments in FIG. 3 (and with implied reference to FIG. 1) the system 100 may automatically exchange dialogue with a customer utilizing the structure provided by the event queue 260, the thoughtful gesture generation device 120, the command queue 270, the API server 122, the NLP server 124, and the communication interface 301 to identify one or more triggers or opportunities to provide a responsive thoughtful gesture and, in turn, generate customized thoughtful gesture(s). That is, the system 100 may determine whether each event received by the thoughtful gesture generation device 120 triggers a thoughtful gesture generation process (e.g., by corresponding with one or more predetermined triggers) in addition to continuing a dialogue with the customer. As part of this process, the system 100 may adaptively respond to customer messages to leverage artificial intelligence in the machine learning models and natural language processing device(s) to adaptively respond to customer communications using natural language before and/or after identifying triggers to provide a responsive thoughtful gesture. Further, repeatedly updating a customer context may enable the system 100 to provide customized gestures to individual customers over time. Thus, in certain example implementations, by applying artificial intelligence and/or machine-learning via the NLP device 124, and by repeatedly updating and maintaining the customer context (i.e., by the thoughtful gesture generation device 120) the system 100 may enable and provide adaptive and/or customized gestures to individual customers based in part on their individual context. While FIG. 3 and the related description appear to show an example of a single cycle of events, it should be appreciated that multiple different cycles of events may be processed in parallel by the thoughtful gesture generation device 120.

In some embodiments, the trained machine learning model 295 may include a people model that serves to estimate a customer's mindset per use case, over time. For example, the people model may estimate how stressed out a customer is and determine, for example, how fast they want to conduct a transaction or interaction. The trained machine learning model 295 may include a relevance measure that may quantitatively assess how relevant a particular conversation with a customer is based on the percent of task completion and rate of return conversations. The trained machine learning model 295 may include an affect recognition functionality that seeks to recognize a customer's emotions based on facial expressions, audio speech signals, images, gestures, blood pressure, heart rate, or other such customer data that may be collected by a user device 102 and transmitted to the system 100. In some embodiments, the trained machine learning model 295 may include payment and financial planning features that model risk factors, savings, and spending patterns over time. In some embodiments, the trained machine learning module 295 may include observations of the accuracy and effectiveness of the automated natural language interactions by tracking business metrics over time, such as, for example, a reduction in call center volume over a period of time. In some embodiments, the trained machine learning module 295 may enable the execution of hypothesis-driven micro-experiments that enable the system to test model hypotheses on a small population of users to validate whether the hypotheses are valid or not.

In some embodiments, the system 100 can provide asynchronous operation, which allows the API server 122, the NLP device 124, and the communication interface 301 to operate independently from one another by separately pulling commands from command queue 270. Accordingly, the entire system may be stateless with no side effects to calling a particular function.

Certain example implementations of the disclosed technology may utilize an approach that is not calculated to perfectly fit into any preexisting framework, but may utilize models for systematically describing domain-relevant creativity components and markers at which to target evaluation approaches, rather than aiming at vague indistinguishability from humanly-generated artifacts. Certain example implementations of the disclosed technology include the use of interactive modules, and framing as additions to the produced artifact.

In accordance with certain example implementations of the disclosed technology, the main input to the thoughtful gesture generation process may include interactive or non-interactive input information, which may enable the system to identify relevant information about a customer, including but not limited to their preferences, biographical information, and current life circumstances. This information may make it possible to (1) identify opportunities for gestures (e.g., finding out about a customer's upcoming anniversary or about their favorite childhood candy that they have not been able to find in a while), and (2) generate appropriate gestures. In some embodiments, requirements constraining the gestures may also be part of the input (e.g., company guidelines restricting what a customer-service representative may do in terms of thoughtful gestures).

In accordance with certain example implementations of the disclosed technology, the output generated may include the gesture itself (e.g., as a list of features or a natural language description, depending on the solution space) and framing. Some implementations may include additional output, such as accompanying facial expressions, music, e-mail, graphical information, sign language, etc.

Certain example implementations of the disclosed technology may include two types of input: one-sided, non-interactive communication received from a customer (such as stories); and/or interactive, back-and-forth communication (such as a conversation) where one of the participants is a customer. Stories may include customer stories in the first person. An illustration of an example customer story (non-interactive) is the following: "I'd like to report that I lost my credit card. I'm sorry I didn't do this sooner, but we were in France for my sister's wedding, and I didn't have my cellphone with me because I can't use it overseas."

An illustration of example (interactive) conversation between a customer and an agent is as follows:

Customer: Hi! I'd like to report that I lost my credit card. I'm sorry I didn't do this sooner, but we were in France for my sister's wedding, and I didn't have my cellphone with me because I can't use it overseas.

Agent: [after eliciting the customer's account information] France, huh? I'm jealous! Any good food?

Customer: Oh, the best cakes ever. And, um, this chicken, haha. With lots of vinegar. I think it's the first dish with lots of vinegar in it that I've ever actually liked.

Agent: You usually dislike vinegar?

Customer: Hm. Maybe I like the smell more than the taste. It reminds me of Christmas ☺.

Agent: That's unusual! Why?

Customer: Well . . . my grandma used to douse all her jewelry in vinegar one week before Christmas, every year. Always one week before, I don't know why. Her whole room would smell of it.

Agent: Wow, I think I'll steal that jewelry-cleaning tip from your grandma ☺ . . . that vinegar chicken you mentioned sounds good, too. You got the recipe ☺?

Customer: No, I'd never make it for myself. That's no fun!

The example conversation may continue, the customer's banking issue may be resolved, and the agent may elect to select and provide a gesture to the customer as related to the dialogue.

Certain example implementations of the disclosed technology may include solution spaces that are (A) constrained, with multiple-choice solutions, (B) constrained, with solutions selectable from the full solution space, and/or (C) unconstrained. For example, in a constrained solution space, multiple-choice variant of the task relevant to the example agent/customer dialogue above, the thoughtful gesture options may include: (a) French recipe cookbook; (b) France tourist guide; (c) chicken recipe cookbook; (d) book of housekeeping tips; (e) bottle of jewelry-cleaning liquid; (f) bottle of vinegar; (g) copy of "A Christmas Carol" by Charles Dickens; (h) copy of "In Search of Lost Time: Vol. 1—Swann's Way" by Marcel Proust; (i) strawberry cake; (j) cellphone; (k) bottle of perfume; (l) bouquet of flowers. A gesture (such as a French recipe cookbook) may be selected from the multiple options for sending to the customer as a thoughtful gesture.

In an example of a constrained solution space, full-access variant of the task relevant to the agent/customer dialogue example above, the solution space may be the set of available books on an e-commerce website, described by title and author name(s). A corresponding gesture may be the book: "In Search of Lost Time: Vol. 1—Swann's Way", Marcel Proust.

In the case of an unconstrained solution space, the agent may offer the following as a gesture: "I am going to send the customer a copy of "In Search of Lost Time: Vol. 1" by Marcel Proust as a gift."

The social implications of dialogue provide its added value: conversation allows additional information to be elicited from the customer beyond what they are likely to offer on their own initiative, as in the example customer/agent dialogue above. Different questions or remarks at any point in the conversation can lead to different dialogue paths. In the example customer/agent dialogue above, the agent, on being told about the trip to France, might have asked (instead of "Any good food?") "What was your favorite thing about France?" or "Does your sister live in France, or did she just have her wedding there?", possibly leading the conversation toward other, more or less specific and salient, customer information.

In accordance with certain example implementations of the disclosed technology, and as provided in the examples above, the solution space of a gesture-generation task can be constrained or unconstrained. When the solution space is constrained, a gesture may be selected from a provided solution space, small or large. For example, a customer service representative might be required to choose a gift for a customer from the available stock of an approved vendor. In this constrained space, the type of gesture may be restricted (e.g., to giving gifts).

In the full-solution-space variant the agent may choose a gesture from the entire solution space. In the multiple-choice variant, the agent may be required to select the most appropriate gesture out of several available options, preselected from the full solution space. This multiple-choice variant has implications for evaluation, e.g., one of the options might already have been identified as being "the best", and "trap" options for thwarting known strategies for gaming the test may be included.

When the solution space is unconstrained, the gesture may include any action (for example, similar to human gestures) such as writing and/or reciting a poem, or creating a mix tape of songs chronologically arranged to reflect the history of the agent's relationship with the customer. The full spectrum of creativity is now at the agent's disposal, should the agent be able to make use of it. In this case, the gesture may be a natural-language construct describing a sequence of actions, which, semantically, may be equivalent to a plan (such as described in Ghallab, M., Nau, D., and Traverso, P., "Automated Planning: Theory and Practice.," San Francisco: Elsevier. 2004).

Certain example implementations of the disclosed technology may include the dimension of interactivity. In accordance with certain example implementations of the disclosed technology, and as provided in the examples above, the two variants of this dimension include: interactive and non-interactive. In the non-interactive variant, the system agent may be presented with a static text, such as a story (i.e., non-interactive communication) or a dialogue snippet, and the system agent may produce a gesture and framing based on the story/dialogue without the system agent being involved in the production of the input non-interactive communication.

In the interactive variant, the system may be actively engaged in dialogue with the customer, and can use the interaction to iteratively refine a gesture, e.g., by eliciting additional information that would help it better adapt the gesture to the customer, while avoiding revealing its intention to make the gesture. In the interactive variant, the system may influence the input received from the customer through its questions and remarks, and the system may be capable of conducting dialogue with a customer by processing and producing utterances in a goal-directed manner. In this case, the gesture generation can be triggered as a side-goal of the conversation primarily targeting the customer's issue, as in the case of human customer service assistants.

Figure 4:
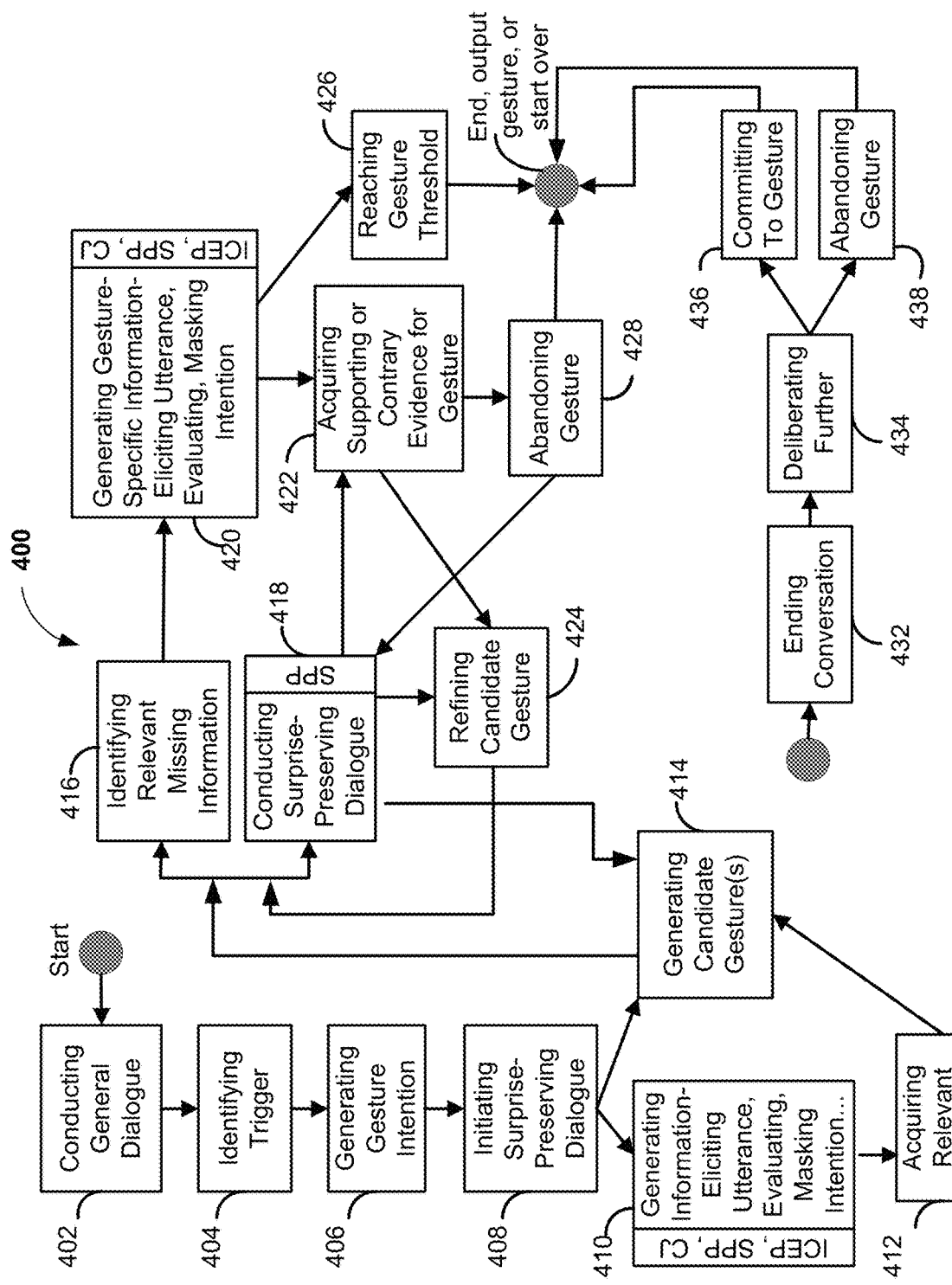
FIG. 4 is a flow diagram 400, which illustrates methods for thoughtful gesture generation, in accordance with certain embodiments of the disclosed technology.

FIG. 4 is a flow diagram 400 that illustrates certain example methods for thoughtful gesture generation, in accordance with certain embodiments of the disclosed technology. In block 402, the method can include conducting general dialogue with a customer. In block 404, the method can include identifying a trigger from the dialogue. In block 406, the method can include generating a gesture intention. In block 408, the method can include initiating surprise-preserving dialogue. In one example implementation of the disclosed technology, and with reference to block 410, the method can include generating an information-eliciting utterance, evaluating the information-eliciting utterance, and masking the intention responsive to the initiation of the surprise preserving dialogue (block 408). In block 412, the method can include acquiring relevant information. In an example implementation, and in block 414, the method can include generating candidate gesture(s) responsive to the acquired relevant information (per block 412). In another example implementation, and in block 414, the method can include generating candidate gesture(s) responsive to initiating the surprise preserving dialogue (per block 418). In block 416, the method can include identifying relevant missing information. In block 418, the method can include conducting surprise-preserving dialogue. In certain implementations, and as indicated in block 424, the method can include refining the candidate gesture, and feeding such information back to block 416 (for further identifying relevant missing information) and/or block 418 (for conducting additional surprise-preserving dialogue). In certain example implementations, the information gained in conducting the surprise preserving dialogue in block 418 may be input back to block 414 to further generate candidate gestures.

In block 420, the method 400 can include generating a gesture-specific information-eliciting utterance, evaluating the utterance, and masking intention responsive to identifying relevant missing information per block 416. In block 422, the method can include acquiring supporting or contrary evidence for the gesture. In one example implementation of the disclosed technology, the method may then revert to block 424 for refining the candidate gesture, or alternatively, as depicted in block 428, the method can include abandoning the gesture and ending the process or starting over. Alternatively, if the gesture is abandoned, the method may revert to block 418 to conduct additional surprise-preserving dialog. Alternatively, and in block 426, the method can include reaching a gesture threshold. In certain example implementations, reaching the gesture threshold may cause the method to end and/or output the selected gesture.

In certain example implementations, once the gesture has been abandoned, per block 428, or once a gesture threshold has been reached, per block 426, the conversation with the customer may be terminated per block 432. In certain example implementations, and as indicated in block 434, the method can include deliberating further. In block 436, according to one example implementation, the method can include committing to the gesture for output responsive to the further deliberation per block 434. In block 438, and according to an example implementation, the method can include abandoning the gesture.

An example process may include increasingly complex modules, based on different combinations of values of dimensions such as the previously-introduced interactivity dimension.

FIG. 5A is an input/output diagram 500A for a non-interactive variant of a challenge module in accordance with certain embodiments of the disclosed technology. FIG. 5B is an input/output diagram 500B for an interactive variant of a challenge module, in accordance with certain embodiments of the disclosed technology. The dashed lines in these figures represent optional input of the solution space 506, 524 and/or additional restrictions 508, 528. According to an example implementation of the disclosed technology, challenge modules may be administered with any of the search space variants. The possible modules can include: (1) a non-interactive story-based module in which the input is a first-person customer story 502 and the system's creative process module 504 may output a gesture 510 accompanied by framing 512 and/or 516; (2) a non-interactive, communication-based module in which the input is a non-interactive communication 502 (such as a dialog that has already taken place, so that the system agent cannot contribute to it and influence its course) where one of the participants is the customer 514 and the output is a gesture accompanied by framing 512 and/or 516; and/or (3) an interactive, dialogue-based module in which the system's creative process 522 module is actively involved in the dialogue, i.e., responding to customer 514 utterance 520 with agent utterance 532 to refine the gesture intention 530 via iterative input and output 534. In the interactive, dialogue-based module, there may be two types of input/output: intermediary, which may be sent to an evaluator 518, and final output 536, in which a gesture 510 and customer-directed framing 512 may be sent to the customer 514. In this implementation, process-related framing 516 may be sent to the evaluator 518.

In certain example implementations, a story 502 or customer utterance 520 may serve as input. As intermediary output, and as illustrated by FIG. 5B, an utterance 532 advancing the dialogue may be presented to the customer 514, and an intermediary process-related output may be presented to an external-observer evaluator 518. The intermediary process-related output may include an intention 530 regarding gestures, for example, the intention 530 may be indication that the system is not currently planning a gesture due to the absence of triggers, or that the system is in the process of selecting or refining a gesture. Throughout this process, utterances can be targeted for obtaining further information for refining the gesture. In accordance with certain example implementations of the disclosed technology, the final output 536 may be a gesture 510 and framing 512 and/or 516. In certain example implementations, the final output 536 may be provided after the conversation has ended.

In the context of computational creativity theory, framing is defined (See, for example Colton, S.; Pease, A., and Charnley, J., "Computational Creativity Theory: The FACE and IDEA Descriptive Models," In Proc. of ICCC 2011, 90-95, 2011) as "a piece of natural language text that is comprehensible by people, which refers to [generative acts]." Framing can include information about the creative process, among others. In certain example implementations, the framing may be mostly external (See Charnley, J. W., Pease, A., and Colton, S., "On the Notion of Framing in Computational Creativity," In Proc. of ICCC, 77-81, 2012) since thoughtful gesture generation is a particularly audience-centric creative act. Certain example implementations of the disclosed technology may include three types of framing: motivation-related, intention-related, and process-related. According to an example implementation of the disclosed technology, the framing should also be factually correct.

The types of framing output, as discussed with reference to FIG. 5A and FIG. 5B above can include (intermediary and final) process-related framing 516 and/or customer-directed framing 512. Process-related framing 516, for example, may be directed to evaluators acting as external observers of the interaction (if any) between the system agent and the customer 514. In certain example implementations, process-related framing 516 may reflect all decision-making that occurs during gesture-generation, including how the process was triggered and, if applicable, how the gesture was iteratively refined. In the interactive variant of the process (FIG. 5B), intermediary process-related framing 516 can be provided during the interaction, thus illuminating the iterative generation and refinement of gestures 510. According to an example implementation of the disclosed technology, the gesture 510 may be in the form of simple, natural language.

Customer-directed framing 512, for example, may play a role similar to that of notes accompanying gifts. Customer-directed framing 512 may contain the following components: (1) acknowledgement of the conversation/story triggering the gesture, and (2) an explanation of the gesture in relation to the content of the story/conversation. When applied to non-interactive communication, the customer-directed framing 512 may be written from the perspective of the (possibly human) agent involved in the communication.

Examples of internal knowledge representation, process-related framing, and customer-directed framing will now be discussed in reference to embodiments of the disclosed system. Certain example implementations of the disclosed technology may be configured to utilize cultural knowledge, process analogical mapping, and/or conduct commonsense reasoning. A partial internal knowledge representation may include a trigger. For example, the trigger may a "trip to France." An analogy may be established between a customer story and the madeleine episode in "In Search of Lost Time," where the smell of vinegar can be mapped to the taste of the madeleine, and memories of Christmases with grandma can be mapped to memories of Aunt Leonie. An additional relevant gesture feature may be the setting (such as in the case of "In Search of Lost Time", where the setting is France). Additional salient customer information may include, for example, dislikes (cooking), which may lead to a rejected gesture (offer French cookbook), or likes (French food) which may influence or refine the gesture.

An example of partial process-related framing is: "I decided to initiate gesture generation when I heard about the customer's trip to France. The gesture is relevant for this customer because [ . . . ]. I first thought of giving the customer a French recipe cookbook, but then I found out that she dislikes cooking. I think the customer's mood will be improved by a gift that reminds her of France because, overall, she seemed to enjoy the trip."

An example of customer-directed framing is: "Dear Claire, [acknowledgement of the conversation containing the gesture trigger] I really enjoyed talking to you about your trip to France! [explanation of the gesture in relation to the conversation] Your story about how the smell of vinegar reminds you of Christmases with your grandma made me think of Proust's story about how the taste of a madeleine dipped in tea brought back childhood memories of his aunt. I hope that you enjoy reading this book and that it reminds you of France ☺!"

While process-related framing need merely be human-readable, customer-directed framing may be held to the same standards as a gift note written by a human (e.g., it should flow well, be grammatically correct, and be sufficiently informative). In some situations, certain pieces of information from process-related framing may be inappropriate for customer-directed framing. In the examples above, it may be inappropriate for the customer-directed framing (i.e., the note) to contain the text: "I first thought about giving you a French recipe cookbook, but then I found out that you dislike cooking".

Certain example implementations of the disclosed technology may include creative processes that produce artifacts that are novel, valuable, and unexpected (See Boden, M. A, "The Creative Mind: Myths and Mechanisms," Weidenfield and Nicholson, London, 1990). Certain example implementations may provide intentionality as an additional criterion (See Ventura, D., "Mere Generation: Essential Barometer or Dated Concept?" In Proc. of ICCC, 17-24, 2016).

In accordance with certain example implementations of the disclosed technology, the agent may perform a process that is P-creative, i.e. produce results that are novel to the agent producing them. In the constrained-solution-space version, in which gestures may be selected, rather than fully synthesized, the novelty and, thus, creativity, may lie in the connection between the input discourse and the gesture, as expressed in the framing.

In accordance with disclosed technology, the generated/selected gesture can be characterized a "thoughtful." For example, the gesture may be socio-emotionally positive, i.e., be likely, based on all available information, to have a positive effect on the customer's mood (e.g., if the customer in the example above had indicated that she had not enjoyed the trip, a gift reminding her of it would have been inappropriate). The thoughtful gesture may be demonstrably rooted in the information provided by the customer, and appropriately justified, without willful disregard of the provided information. For example, a French recipe cookbook, although relevant to the conversation in the example above, would be a gift that shows disregard or ignorance of the customer's expressed preference not to cook.

Certain example implementations of the disclosed technology may include providing an unexpected and/or surprise gesture. For example, agent utterances 532 in the interactive variant (FIG. 5B) of the task may be targeted at increasing value by acquiring relevant information for gesture refinement, and may maintain unexpectedness by not revealing information pertaining to the planned gesture. In certain example implementations of the disclosed technology there may be no obvious set of expectations against which to evaluate the unexpectedness of generated gestures.

Certain example implementations of the disclosed technology may include intentionality, which is defined as "the fact of being deliberative or purposive; that is, the output of the system is the result of the system having a goal or objective—the system's product is correlated with its process." (See Ventura, D., "Mere Generation: Essential Barometer or Dated Concept?" In Proc. of ICCC, 17-24, 2016). Example embodiments of the disclosed technology may enable system agents to demonstrate their intentionality through framing, particularly process-related framing.

Figure 6:
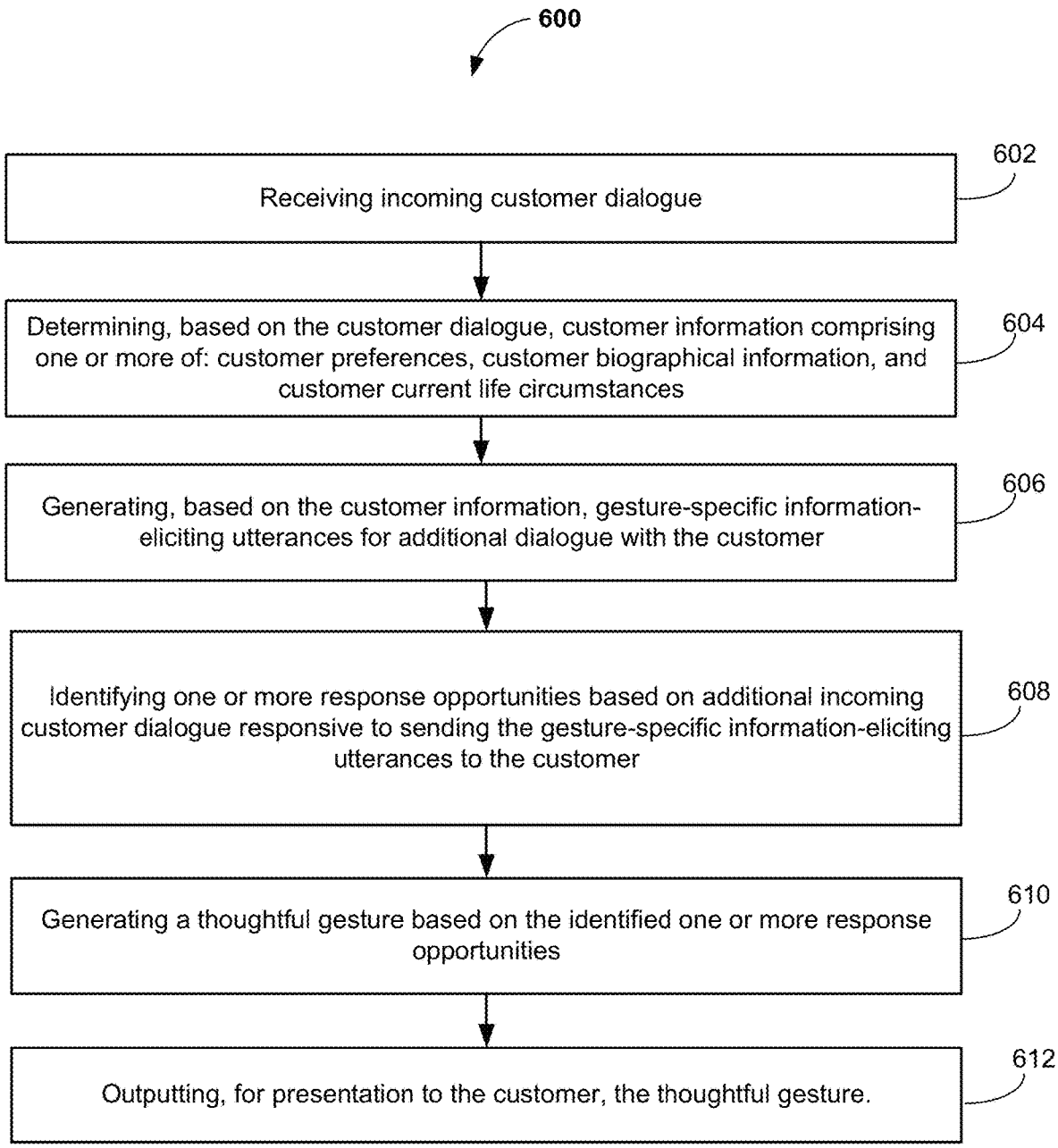
FIG. 6 is a flow chart of a method 600, in accordance with an example implementation of the disclosed technology.

FIG. 6 is a flow chart of a method 600 for autonomously generating a thoughtful gesture for a customer, in accordance with an example implementation of the disclosed technology. In block 602, the method 600 includes receiving incoming customer dialogue. In block 604, the method 600 includes determining, based on the customer dialogue, customer information comprising one or more of: customer preferences, customer biographical information, and customer current life circumstances. In block 606, the method 600 includes generating, based on the customer information, gesture-specific information-eliciting utterances for additional dialogue with the customer. In block 608, the method 600 includes identifying one or more response opportunities based on additional incoming customer dialogue responsive to sending the gesture-specific information-eliciting utterances to the customer. In block 610, the method 600 includes generating a thoughtful gesture based on the identified one or more response opportunities. In block 612, the method 600 includes outputting, for presentation to the customer, the thoughtful gesture.

Figure 7:
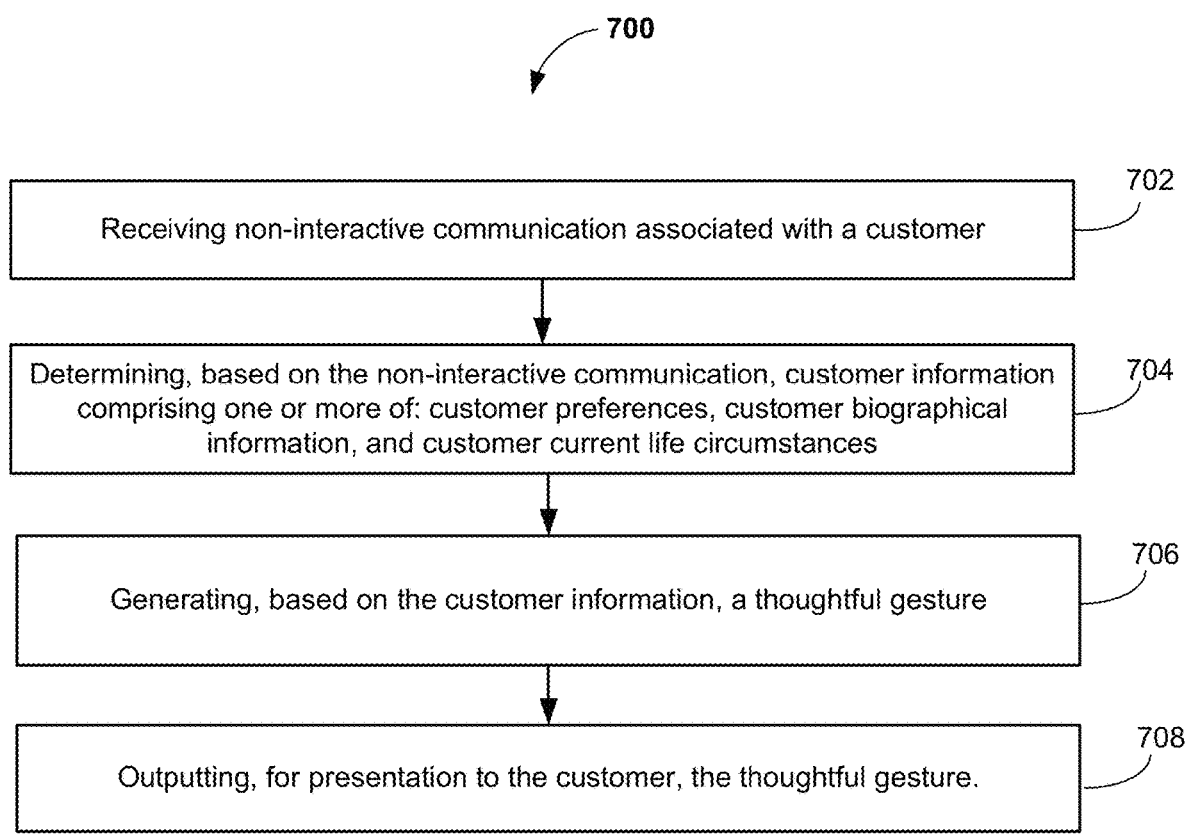
FIG. 7 is a flow chart of a method 700, in accordance with an example implementation of the disclosed technology.

FIG. 7 is a flow chart of a non-interactive method 700 for autonomously generating a thoughtful gesture for a customer, in accordance with an example implementation of the disclosed technology. In block 702, the method 700 includes receiving a non-interactive communication associated with a customer. In block 704, the method 700 includes determining, based on the non-interactive communication, customer information comprising one or more of: customer preferences, customer biographical information, and customer current life circumstances. In block 706, the method 700 includes generating, based on the customer information, a thoughtful gesture. In block 708, the method 700 includes outputting, for presentation to the customer, the thoughtful gesture.

Certain example implementations of the disclosed technology can include gesture generation by the system agent(s) engaged in an interactive dialogue. Specific agents, for example, may approach parts of the process otherwise than exemplified herein, or their overall approach may be different. However, the embodiments disclosed herein may help guide the identification of capabilities needed by the system (such as surprise-preserving) so that the system can effectively engage in the gesture-generation tasks.

Certain example implementations of the disclosed technology may include a general conversation between a system agent and customer. For example, the process may begin as a conversation regarding banking matters between the system agent and the customer (e.g., block 402 in FIG. 4). At some point during the conversation, a trigger may be identified (block 404) by the system agent responsive to a customer utterance that causes the system agent to compute that a gesture may be opportune for this particular customer, and the system agent may acquire a gesture intention (block 406). Either at the same time as acquiring the gesture intention or later during the dialogue, the system agent may come up with one or more candidate gestures (block 414). On generating a candidate gesture, the system agent may immediately be reasonably certain (block 426) that this particular gesture is appropriate for the customer (e.g., if the customer utterance is: "I've always wanted to read "In Search of Lost Time", but was simply never able to find Volume 1!", the system agent might cause the system to order a copy of the elusive volume for the customer). In this case, the system agent can optionally bypass steps of eliciting any additional gesture-related information. However, the candidate gesture will be abandoned (block 428) later on if the customer, on their own initiative, provides information that disproves the appropriateness of the gesture (e.g., C: "So, this summer I finally found Volume 1 and read it!").

On the other hand, if the system agent (a) is considerably unsure of the appropriateness of a candidate gesture (e.g., "Does the customer like ice cream?"), (b) needs more information to fully customize the gesture (e.g., "I know the customer likes ice-cream, but which flavor?"), and/or (c) needs to choose between several different possible gestures (e.g., "I know the customer likes lemon ice cream and vanilla ice cream, but which does she like more?"), then surprise-preserving dialogue can be conducted (block 418).

In accordance with certain example implementations of the disclosed technology, triggers (identified in block 404) are pieces of salient information from customer utterances that may cause the initiation of a gesture generation process. They are system agent-specific, so information ignored by certain system agents may be found salient by others. The trigger may immediately provide the system agent with a more or less specific idea of what the gesture(s) might be, or it could simply signal an opportunity for a gesture that the system agent now needs to come up with.

Example possible trigger types (which can overlap) include:

(1) highly emotionally-charged utterances, of positive or negative valence, identified as such because of (a) the use of emotion-related words, phrases, sentences, punctuation, capitalization, emoticons, etc. (e.g., "I'm having the WORST DAY EVER, you're my last hope ☹☹☹ !!!"), or (b) narrative content with emotional implications (e.g., "My flight to France was canceled because of the weather, so I missed my sister's wedding.");

(2) utterances that express customer preferences (e.g., "I especially like reading very long books, the more volumes the better!");

(3) unexpected utterances (e.g., "the smell of vinegar reminds me of Christmas" as opposed to "the smell of cinnamon reminds me of Christmas").

The utterances may be unexpected in the context of the particular conversation or more generally, in relation to the system agent's entire access to world knowledge and/or conversational experience. Alternatively, any of the types of utterances above can provide additional relevant context for gesture generation if they occur after the gesture generation process has begun.

Certain example implementations of the disclosed technology may include a system configured to produce surprise-preserving dialogue. For example, while attempting to acquire additional information that can help the system refine/select gestures and/or assess their suitability, the system agent may also avoid revealing information that is likely to give away its thoughtful intentions and the specifics of the intended gesture(s). Therefore, surprise plays two main parts in this process: (1) surprise may be preserved by the information-eliciting utterances, and (2) surprising utterances by the customer can act as triggers or other salient information for gesture generation. Assuming cognitive agents with the abilities to hold beliefs and to reason about the beliefs of others, the task may be related to impression management targeted at "changing minds" (See Bridewell, W., and Bello, P., "Reasoning about Belief Revision to Change Minds: A Challenge for Cognitive Systems," Advances in Cognitive Systems, 3, 107-122, 2014). However, example system agents need not change any beliefs of customers. They merely may avoid introducing two specific kinds of additional beliefs: (1) that the agent is planning a gesture, and (2) what the planned gesture is. In the context of surprise-preserving dialogue, the relevant characteristics of system agent utterances are: (1) informational-content-eliciting potential; (2) surprise-preservation potential; and (3) context justifiability (i.e., is the utterance expected in the current dialogue context?), which contributes to surprise-preservation potential. Maintaining surprise-preserving potential may involve providing as much information as is needed, and no more. For example, if the system agent provides information that is not needed, it might strike the customer as peculiar, which might lead the customer to suspect that the agent is planning a gesture.

An example implementation of the disclosed technology may include one or more of the following types of steps: (1) generating gesture intentions; (2) generating general information-eliciting utterances (i.e., when the system agent has a gesture intention but no partial gesture candidates); (3) generating candidate gestures; (4) identifying relevant missing gesture-related information; (5) generating gesture-specific information-eliciting utterances; (6) acquiring supporting evidence for a gesture (such evidence includes customer positive preferences, or "likes"); (7) acquiring contrary evidence for a gesture (includes customer negative preferences, or "dislikes", and may or may not be decisive in abandoning the gesture); (8) abandoning a candidate gesture; (9) refining a candidate gesture; (10) masking an utterance intention, so as to preserve the informational-content-elicitation potential of the utterance while increasing its context justifiability; (11) abandoning a gesture intention; (12) reaching a gesture threshold (no further information-elicitation needed unless contrary information is provided by the customer, the agent may commit to this gesture after the conversation ends); and (13) committing to a gesture (which may happen after the conversation has ended, as additional relevant information can come up at any time; reasoning could also occur after the end of the conversation).

In accordance with certain example implementations of the disclosed technology, surprise-preserving dialogue may be generated to elicit additional information for the refinement of possible gestures. Potential utterances may be evaluated in terms of informational-content-eliciting potential (ICEP), surprise-preservation potential (SPP), and context justifiability (CJ). For example, the preceding illustrative discussion between the system agent and the customer may proceed from the point in the conversation where the system agent has identified two possible gestures as gifts: a French Recipe Book, and the book "In Search of Lost Time." For example, the gesture intention may be "yes" and the candidate gesture may be a "French Recipe Book." The utterance by the customer: "Well . . . my grandma used to douse all her jewelry in vinegar [ . . . ] Her whole room would smell of it" may be used to generate a candidate gesture of the book "In search of Lost Time." The system may generate an utterance to determine relevant missing information for the candidate gesture of the French Recipe book, such as "does the customer like cooking." In response, a possible information-eliciting utterance for the candidate gesture may be: "Do you like cooking?" [high ICEP, medium SPP]. The system may mask the utterance intention by linking it to the conversation context, for example, the system agent may respond: "Wow, I think I'll steal that jewelry-cleaning tip from your grandma ☺ . . . that vinegar chicken you mentioned sounds good, too. You got the recipe ☺?" and the customer reply "No, I'd never make it for myself. That's no fun!" may provide contrary evidence for the French Recipe Book and that related gesture may be abandoned. The system may then attempt to identify relevant missing information for the candidate gesture "In Search of Lost Time" by asking if the customer has read the book [very high ICEP, very low SPP], if the customer would like to read the book, or if the customer even likes to read [high ICEP, low CJ, hence low SPP]. The system agent may mask utterance intention by linking it to conversation context by uttering: "Haha! So, I get the food was great. What else did you like about your trip? Any good vacation reading?" to which the customer may reply: "Nooo! That's no fun for me either ☺," which may provide decisive contrary evidence for providing the gesture of the book "In Search of Lost Time", and the gesture intention may be abandoned.

In this example, the system agent is considering two possible gestures, but determines that it needs more information to reach its certainty threshold for either one of them. The system agent reasons that three pieces of information could help it make its decision: (1) does the customer already own this book?, (2) has the customer already read this book?, and (3) would this book constitute a good preference match for the customer? The agent might ask "Have you read In Search of Lost Time?" However, this question, while high in informational-content-eliciting potential, would be minimally low in surprise-preservation potential. To determine if the book would be a good preference match for the customer, the system may generate several questions for eliciting relevant information, such as: "Do you like reading?" or, more specifically, "What kind of novels do you like"? or "Do you like early $20^{th}$ century literature?" In this example, the system agent may settle on the more general question. However, asking this question in its raw form would be conversationally awkward in the current context of the dialogue as it has low contextual justification. Instead, the system agent may mask its intention by incorporating a related question more convincingly into the conversation (i.e., "Haha! So, I get the food was great. What else did you like about your trip? Any good vacation reading?"). The customer's response may cause the "In Search of Lost Time" candidate gesture to be dropped. Having dropped both its gesture candidates, the system agent may choose to also drop its gesture intention. Such deliberation and decision-making may be described in process-related framing. In accordance with certain example implementations of the disclosed technology, surprise-preserving dialogue may be used to acquire as much information as possible without revealing the system agent's intention to make a thoughtful gesture.

Certain evaluation capabilities may be included in the systems and methods disclosed herein, and may be integrated into a developmental process. For example, the three types of output (gestures 510, customer-directed framing 512, and process-related framing 516) as discussed above with respect to FIG. 5A and FIG. 5B can be used in varied ways. For example, there is a practical distinction between the non-interactive (FIG. 5A) and interactive (FIG. 5B) variants, as the latter may involve system agents that are full-fledged dialogue systems that also have gesture-generation capabilities. Such a system may be assessed by humans playing two types of roles: (a) customers interacting directly with the dialogue system, and (b) observers of the conversational exchange and of the intermediary and final process-related framing. Certain example implementations of the disclosed technology may be utilized to evaluate the quality of the gestures. Certain example implementations of the disclosed technology may distinguish the quality of the gesture from the system agent's conversational capability.

For the non-interactive, unconstrained solution space variant, human evaluators may be first presented with the non-interactive input. After reading it completely, the human evaluators may be shown the gesture generated by the system agent and they may answer several survey questions based on the input and gesture alone. The human evaluators may then be shown the customer-directed framing and (1) answer new questions, about the framing itself and about the connection between the framing and the gesture, and (2) re-answer the previous gesture-related questions. Finally, the human evaluators may be shown the process-related framing, and (1) answer questions about this additional framing, and (2) re-answer the initial gesture-related questions. A subset of the questions may be re-asked because answers (e.g., regarding the clarity of the system agent's reasons for choosing a gesture) may change after reading the framing. Process-related framing can help mitigate the Placebo Effect that can occur when the evaluator is exposed to the more emotionally-involving language of the input discourse and the note, potentially causing them to overestimate the intentionality reflected in a gesture. Certain example implementations of the disclosed technology may assess value, unexpectedness, and the appearance of intentionality. Questions can be focused on that can be answered by non-expert human evaluators. Some aspects of creativity (e.g., whether the gesture is truly novel, given its generative process, or whether the system agent's generative process is accurately reflected in its process-related framing) may be evaluated in different ways. The answers may be subjective (e.g., anticipated negative consequences are likely to be evaluator-specific), but this is the same sort of subjectivity with which gestures are received in inter-human relationships.

The following examples illustrate the use of evaluation statements, with identified creativity aspects that they may be intended to evaluate. For example, creativity aspects can include: value (V), intentionality (I), and unexpectedness (U). The answers to these evaluation statements may be numerical (i.e., on a scale of 1 to 10) or they may be free form. According to an example implementation of the disclosed technology, these evaluation statements may be utilized to evaluate the effectiveness of the system.

A. Gesture
  i. The gesture will have a positive effect on the customer's mood. [V—Value]
  ii. It is clear why the agent chose the gesture. [I—Intentionality]
  iii. The choice of gesture is unexpected. [U—Unexpectedness]
  iv. The gesture is creative. [V, U, I]
  v. The gesture is appropriate in the context of the conversation. [V]
  vi. One or more aspects of this gesture is/are inappropriate. [V]
  vii. The gesture demonstrates no misunderstandings of the information. [V]
  viii. The gesture is unlikely to be misunderstood by the customer. [V]
  ix. I can think of no unintended negative consequences of the gesture. [V]
  x. [free-form] Here is a better gesture I thought of: [ . . . ] [V]
B. Customer-directed framing
  xi. The note is well-written. [V]
  xii. The note meets the structural requirements. [V]
C. Gesture+Customer-directed framing
  xiii. The note is appropriate for the gesture. [V]
D. Gesture+Process-related framing
  i. The agent knew what it was doing when it came up with the gesture. [I]

According to certain example implementations, in Turing-Test-like variants of the evaluation, multiple agents, human and AI, can be exposed to the input discourse, and generate gestures and framing; then, human evaluators may attempt to distinguish between the gesture/framing pairs generated by humans and those generated by AI agents.

One challenge for AI gesture generation that is addressed by the systems and methods disclosed herein is in the handling of autobiographical memory, preferences, opinions, and feelings of the customer. Certain example implementations of the disclosed technology utilize the simplifying assumption that gestures are receiver-centric, i.e. they may be based solely on what the system agent infers from the customer dialogue or discourse. In framing, for example, the system agent may discuss the customer's feelings. The system agent may be configured to take the approach of a good and humble interviewer, who keeps themselves out of the spotlight to let their interviewee shine.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A dialogue management device for autonomously generating thoughtful gestures for a customer, the dialogue management device comprising:
   a thoughtful gesture generation device comprising:
      a first processor;
      an event queue; and
      a rule-based platform;
   a natural language processing device comprising a second processor; and
   memory in communication with at least the first processor and storing instructions that, when executed by the first processor, cause the dialogue management device to:
      receive, via the event queue, incoming customer dialogue;
      determine, by the thoughtful gesture generation device, based on the incoming customer dialogue, customer information comprising one or more of: customer preferences, customer biographical information, and customer current life circumstances;
      generate, by the first processor, from a solution space of available candidate thoughtful gestures and based on the determined customer information, a candidate thoughtful gesture;
      generate, by the rule-based platform of the thoughtful gesture generation device, dialog modifying commands that program the natural language processing device to output surprise-preserving dialogue to elicit from the customer additional gesture refinement information while avoiding revealing the candidate thoughtful gesture by masking dialogue related to the candidate thoughtful gesture;
      modify, by the natural language processing device and based on the dialog modifying commands, the candidate thoughtful gesture based on additional incoming customer dialogue responsive to the surprise-preserving dialogue; and
      output, for presentation to the customer, the modified candidate thoughtful gesture.

2. The dialogue management device of claim 1, wherein the solution space is constrained for selection, and wherein the instructions cause the dialogue management device to generate the candidate thoughtful gesture by a selection of a thoughtful gesture of the available candidate thoughtful gestures from a constrained solution space or from a preselected subset of the constrained solution space.

3. The dialogue management device of claim 1, wherein the solution space is unconstrained, and wherein the instructions cause the dialogue management device to generate the thoughtful gesture as a natural-language construct describing a sequence of actions.

4. The dialogue management device of claim 1, wherein the instructions are further configured to cause the dialogue management device to generate agent dialogue responsive to the incoming customer dialogue to further identify response opportunities.

5. The dialogue management device of claim 1, wherein the candidate thoughtful gesture is generated based on a dialogue trigger, wherein the dialogue trigger comprises salient information detected in the incoming customer dialogue by the thoughtful gesture generation device.

6. The dialogue management device of claim 1, wherein the instructions are further configured to cause the dialogue management device to send the surprise-preserving dialogue to a computing device associated with the customer to elicit additional information.

7. The dialogue management device of claim 6, wherein the additional information is utilized to refine the candidate thoughtful gesture.

8. The dialogue management device of claim 1, further comprising a trained machine learning model.

9. A computer-implemented method for autonomously generating a thoughtful gesture for a customer, comprising:
   receiving, by a natural language processing device in communication with a thoughtful gesture generation device processor, incoming customer dialogue;
   determining, by the thoughtful gesture generation device processor, based on the incoming customer dialogue, customer information comprising one or more of: customer preferences, customer biographical information, and customer life circumstances;
   generating, by the thoughtful gesture generation device processor, from a solution space of available candidate thoughtful gestures and based on the determined customer information, a candidate thoughtful gesture;
   generating, by a rule-based platform of the thoughtful gesture generation device processor, dialogue-modifying commands that program the natural language processing device to output surprise-preserving dialogue to elicit from the customer additional gesture refinement information while avoiding revealing the candidate thoughtful gesture by masking dialogue related to the candidate thoughtful gesture;
   modifying, by the natural language processing device and based on the dialogue modifying commands the candidate thoughtful gesture based on additional incoming dialogue responsive to the surprise-preserving dialogue; and
   outputting, for presentation to the customer, the modified candidate thoughtful gesture.

10. The method of claim 9, wherein the candidate thoughtful gesture is generated based on a pre-established solution space.

11. The method of claim 9, wherein generating the candidate thoughtful gesture is further based on a dialogue trigger.

12. The method of claim 11, wherein the dialogue trigger comprises salient information detected in the incoming customer dialogue by the thoughtful gesture generation device.

13. The method of claim 9, further comprising generating one or more of: gesture intentions; general information-eliciting utterances when no partial gesture candidates are determined; and additional candidate gestures.

14. The method of claim 9, further comprising one or more of:
   identifying relevant missing gesture-related information;
   generating gesture-specific information-eliciting utterances;
   acquiring supporting evidence for a gesture;
   acquiring contrary evidence for a gesture;
   abandoning a candidate gesture;
   refining a candidate gesture;

masking an utterance intention to preserve informational content elicitation potential of an utterance while increasing its context justifiability;
abandoning a gesture intention;
committing to a gesture; and
ordering a product for sending to the customer.

* * * * *